(12) United States Patent
Tonomura et al.

(10) Patent No.: US 6,772,186 B1
(45) Date of Patent: Aug. 3, 2004

(54) MULTIMEDIA MULTIPLY-ADDER

(75) Inventors: Motonobu Tonomura, Kodaira (JP); Fumio Arakawa, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 473 days.

(21) Appl. No.: 09/618,560

(22) Filed: Jul. 18, 2000

(30) Foreign Application Priority Data

Jul. 19, 1999 (JP) .......................................... 11-204219

(51) Int. Cl.[7] .............................................. G06F 7/52
(52) U.S. Cl. ..................................... 708/625; 708/603
(58) Field of Search ................................. 708/523, 603, 708/620, 625, 626, 627, 628, 629, 630, 631, 632

(56) References Cited

U.S. PATENT DOCUMENTS

| | | | | |
|---|---|---|---|---|
| 5,031,135 A | * | 7/1991 | Patel et al. .................. | 708/553 |
| 5,121,352 A | * | 6/1992 | Hesson ........................ | 708/625 |
| 5,754,456 A | | 5/1998 | Eitan et al. | |
| 5,764,558 A | * | 6/1998 | Pearson et al. ............. | 708/625 |
| 6,144,980 A | * | 11/2000 | Oberman .................... | 708/627 |
| 6,151,617 A | * | 11/2000 | Costa et al. ................. | 708/625 |

FOREIGN PATENT DOCUMENTS

| | | |
|---|---|---|
| JP | 01-088831 | 4/1989 |
| JP | 64-88831 | 4/1989 |
| JP | 63-000623 | 1/1998 |

OTHER PUBLICATIONS

Motonobu Tonomura, *High-Speed Digital Circuit for Discrete Cosine Transform*, IEICE Trans. Fundamentals, vol. E78-A, No. 8, pp. 957-962, AUg. 1995.

* cited by examiner

*Primary Examiner*—Chuong Dinh Ngo
(74) *Attorney, Agent, or Firm*—Miles & Stockbridge P.C.

(57) ABSTRACT

A multimedia processor is capable of concurrently carrying out processing tasks at different degrees of precision suitable for a variety of purposes and displays high performance of consecutively outputting a new cumulative result by adding or subtracting a result of multiplication to or from an existing cumulative result. To prevent the processing precision from deteriorating in applications where the processing precision is critical, critical processing precision is assured by multiplication of a signed number by an unsigned number. A partial product output by a multiplication and an existing cumulative result are supplied. The number of inputs is counted by a carry-save counter based on a 7-3 counter. A ripple adder is employed on the low-order-digit side where propagation of carry is completed early. On the other hand, a carry select/look-ahead adder is employed on the high-order-digit side to speed up the propagation of a carry. In this way, a multimedia multiply adder/subtractor can be assembled with a small number of gate stages. As a result, there is exhibited an effect that, when it is desired to store a series of multiplication results obtained consecutively, a carry-save result produced in a middle of one machine cycle can be input and stored for further use when an eventual result of propagation of a carry can not be output during the one machine cycle.

14 Claims, 18 Drawing Sheets

FIG. 5

|  |  |  |  |  |  |  |  |  |  |  |  |  |  |  |  |  |
|---|---|---|---|---|---|---|---|---|---|---|---|---|---|---|---|---|
|  |  |  |  |  |  | $-x_7$ | $x_6$ | $x_5$ | $x_4$ | $x_3$ | $x_2$ | $x_1$ | $x_0$ |  |  |  |
|  | × |  | $-y_8$ | $y_7$ | $y_6$ | $y_5$ | $y_4$ | $y_3$ | $y_2$ | $y_1$ | $y_0$ |  |  |  |  |  |
|  |  |  |  | $\overline{x_7}y_0$ | $x_6y_0$ | $x_5y_0$ | $x_4y_0$ | $x_3y_0$ | $x_2y_0$ | $x_1y_0$ | $x_0y_0$ |  |  |  |  |  |
|  |  |  | $\overline{x_7}y_1$ | $x_6y_1$ | $x_5y_1$ | $x_4y_1$ | $x_3y_1$ | $x_2y_1$ | $x_1y_1$ | $x_0y_1$ |  |  |  |  |  |  |
|  |  | $\overline{x_7}y_2$ | $x_6y_2$ | $x_5y_2$ | $x_4y_2$ | $x_3y_2$ | $x_2y_2$ | $x_1y_2$ | $x_0y_2$ |  |  |  |  |  |  |  |
|  | $\overline{x_7}y_3$ | $x_6y_3$ | $x_5y_3$ | $x_4y_3$ | $x_3y_3$ | $x_2y_3$ | $x_1y_3$ | $x_0y_3$ |  |  |  |  |  |  |  |  |
| $\overline{x_7}y_4$ | $x_6y_4$ | $x_5y_4$ | $x_4y_4$ | $x_3y_4$ | $x_2y_4$ | $x_1y_4$ | $x_0y_4$ |  |  |  |  |  |  |  |  |  |

(Partial products arranged in multiplication layout)

$$\begin{array}{r}
-x_7\ x_6\ x_5\ x_4\ x_3\ x_2\ x_1\ x_0 \\
\times\quad -y_8\ y_7\ y_6\ y_5\ y_4\ y_3\ y_2\ y_1\ y_0 \\
\hline
\overline{x_7}y_0\ x_6y_0\ x_5y_0\ x_4y_0\ x_3y_0\ x_2y_0\ x_1y_0\ x_0y_0 \\
\overline{x_7}y_1\ x_6y_1\ x_5y_1\ x_4y_1\ x_3y_1\ x_2y_1\ x_1y_1\ x_0y_1 \\
\overline{x_7}y_2\ x_6y_2\ x_5y_2\ x_4y_2\ x_3y_2\ x_2y_2\ x_1y_2\ x_0y_2 \\
\overline{x_7}y_3\ x_6y_3\ x_5y_3\ x_4y_3\ x_3y_3\ x_2y_3\ x_1y_3\ x_0y_3 \\
\overline{x_7}y_4\ x_6y_4\ x_5y_4\ x_4y_4\ x_3y_4\ x_2y_4\ x_1y_4\ x_0y_4 \\
\overline{x_7}y_5\ x_6y_5\ x_5y_5\ x_4y_5\ x_3y_5\ x_2y_5\ x_1y_5\ x_0y_5 \\
\overline{x_7}y_6\ x_6y_6\ x_5y_6\ x_4y_6\ x_3y_6\ x_2y_6\ x_1y_6\ x_0y_6 \\
\overline{x_7}y_7\ x_6y_7\ x_5y_7\ x_4y_7\ x_3y_7\ x_2y_7\ x_1y_7\ x_0y_7 \\
\overline{x_6}y_8\ \overline{x_5}y_8\ \overline{x_4}y_8\ \overline{x_3}y_8\ \overline{x_2}y_8\ \overline{x_1}y_8\ \overline{x_0}y_8 \\
-(x_7\vee y_8)\qquad\qquad\qquad\qquad\qquad y_8\quad x_7\overline{y_8}
\end{array}$$

| | | | | | | | | | | | | | | | | |
|---|---|---|---|---|---|---|---|---|---|---|---|---|---|---|---|---|
| SUBTRACT TERM | | | | | | | | | $x_6y_8$ | $x_5y_8$ | $x_4y_8$ | $x_3y_8$ | $x_2y_8$ | $x_1y_8$ | $x_0y_8$ | |
| ADDITION TERM | $-a_{15}$ | $a_{14}$ | $a_{13}$ | $a_{12}$ | $a_{11}$ | $a_{10}$ | $a_{09}$ | $a_{08}$ | $a_{07}$ | $a_{06}$ | $a_{05}$ | $a_{04}$ | $a_{03}$ | $a_{02}$ | $a_{01}$ | $a_{00}$ |
| NUMBER OF INPUT | $-2$ | 3 | 4 | 5 | 6 | 7 | 8 | 10 | 10 | 9 | 8 | 7 | 6 | 5 | 4 | 3 |
| POSITION | 15 | 14 | 13 | 12 | 11 | 10 | 09 | 08 | 07 | 06 | 05 | 04 | 03 | 02 | 01 | 00 |

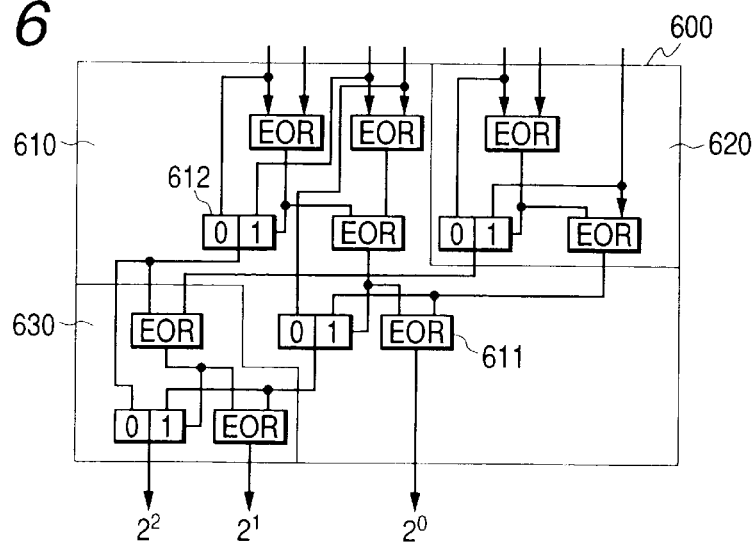

FIG. 6

7-3 COUNTER

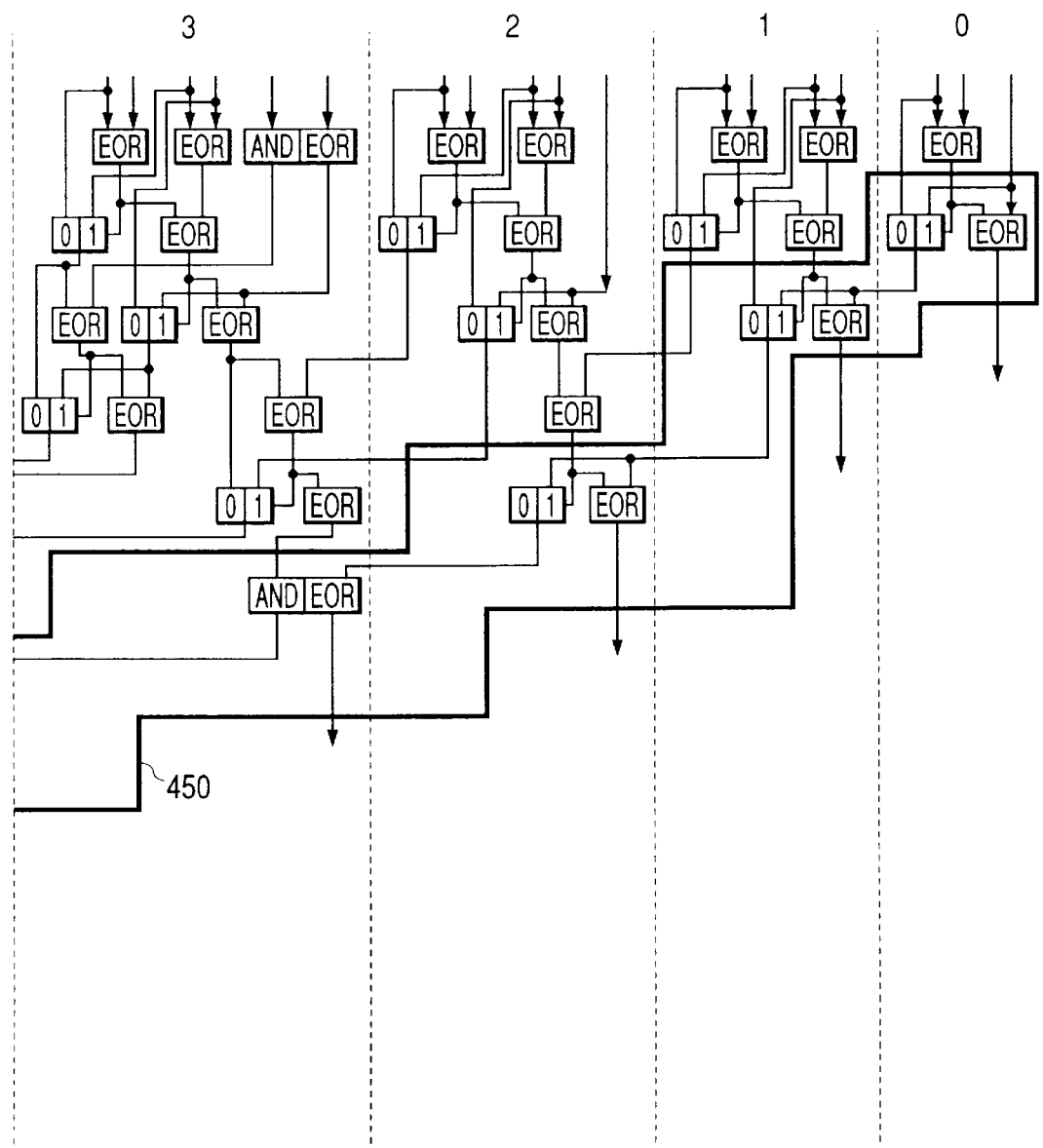

| FIG. 9C | FIG. 9B | FIG. 9A |

| FIG. 11C | FIG. 11B | FIG. 11A |

US 6,772,186 B1

MULTIMEDIA MULTIPLY-ADDER

FIELD OF THE INVENTION

This invention relates generally to a processor and is more particularly concerned with a microprocessor having a multimedia multiply-subtractor/adder which assures critical processing precision by properly combining multiplications, additions and subtractions in efficient execution of mass multimedia processing.

BACKGROUND OF THE INVENTION

In the conventional microprocessor, multiplication of numerical data by numerical data is generally carried out. In conventional multiplication, either an unsigned multiplicand is multiplied by an unsigned multiplier or a signed multiplicand is multiplied by a signed multiplier. That is, the multiplicand and the multiplier are generally of the same type.

With data handled by multipliers and processors becoming more diversified, there has been proposed a processor including an embedded piece of hardware capable of multiplying a signed multiplicand by a signed multiplier or an unsigned multiplicand by an unsigned multiplier. In addition, there has been proposed a multiplier capable of carrying out four types of multiplication as disclosed in Japanese Patent Prepublication Nos. Sho 63-623 and Sho 64-88831. Two of the four types are the conventional multiplication of an unsigned multiplicand by an unsigned multiplier and the conventional multiplication of a signed multiplicand by a signed multiplier. The remaining two of the four types are multiplication of an unsigned multiplicand by a signed multiplier and multiplication of a signed multiplicand by an unsigned multiplier.

In the functional aspect of a processor, it is necessary to support a multiply-addition instruction in order enhance the signal processing performance and the multimedia processing performance of the processor. In recent years, the number of processors incorporating a dedicated processing unit having the multiply-addition function has been increasing. In addition, in order to make the processing configuration suitable for multimedia processing, the number of processed bits is optimized, and there has been adopted a parallel processing mechanism called SIMD (Single Instruction stream-Multiple Data stream) wherein all input/output bits of a processor are divided into a plurality of blocks each having a size of n bits where n does not exceed ½ the number of input/output bits. An example of the processor adopting the SIMD mechanism is Intel's MMX Pentium processor.

In the multiplier or the processor described above, however, the inventor has discovered a number of problems.

In order to identify the characteristic of a multimedia processing function to which the present invention is applied, a multiply-addition processing algorithm of a discrete cosine transform used in picture processing is considered as an example. Since the processing is picture processing, the computation formula is 2-dimensional and the multiply term is a double product such as $(X(i, j) \cdot B(i)) \cdot C(j)$ wherei and j are subscripts of the addition in the two dimensions respectively, X(I, j) is a variable or a picture—data value and B(I) and C(j) are cosine constants. Normally, 2-dimensional multiply-addition is split into two 1-dimensional operations. That is, first of all, multiply-addition of $D(j)=X(i, j) \cdot B(i)$ is carried out with respect to i. Then, multiply-addition of $Y=D(j) \cdot C(j)$ is carried out with respect to j.

In these operations, the following problem is raised. In general, a product X×Y of a As. multiplication of an n-bit multiplier by an n-bit multiplicand is 2n bits in size as shown in FIG. 2. For n=16, for example, the product of a multiplication of a 16-bit multiplier by a 16-bit multiplicand is 32 bits in size. Since the processing is 2-dimensional, however, the product must be multiplied by a 1-dimensional multiply-addition result once again. In this case, since the product obtained as a result of the first multiply-addition is 32 bits in size, in the second multiply-addition, the 32-bit result must be multiplied by a 16-bit multiplier. In this case, since the size of the multiplicand is different from the size of the multiplier, the same multiplier can not be used. It is thus desirable to reduce the result of the first multiply-addition to 16 bits so that, in the second multiply-addition, the 16-bit result is multiplied by a 16-bit multiplier to give a 32-bit product which is also reduced to a 16-bit final result. It is thus necessary to approximate the 32-bit product of a 16-bit multiplicand and a 16-bit multiplier by a 16-bit number.

Consider the following case. As shown in FIG. 2, data 10 is a number having a sign 11. A constant 20 is also a number having a sign 21. Used as a multiplicand and a multiplier with a uniform format, the numerical data 10 and the constant 20 are subjected to a multiply-addition with a size of 16 bits×16 bits to give a 32-bit product 30. Then, the 32-bit product 30 is approximated by a number with a size of 16 bits obtained as a result of extraction of the 16 high-order bits from the product 30. The multiplication result 30 has 2 sign bits, namely, bits 31 and 32. Strictly speaking, the sign bit s is shifted to the high-order bit of the 2 sign bits, namely, bit 32. The approximation number with a size of 16 bits is necessary to have a signed number having a precision of 15 bits. In order to solve this problem, the multiplication result 30 is shifted to the left by 1 bit to discard the extra sign bit, that is, bit 32. That is, in order to express the final cumulative result 40 by an approximation number with a size of 16 bits, the multiplication result 30 is shifted to the left by 1 bit with its precision being maintained and stored in a cumulative register. The critical precision is considered to be insufficient unless the operations described above are carried out in the application of the SIMD technique to picture processing.

As will be appreciated from the above description, in order to assure the precision of multiplication of signed numbers as part of expansion of the conventional multiply-addition function, a function to shift a multiplication result to the left by 1 bit if necessary and to add the left-shifted multiplication result to a cumulative result obtained so far is required in multimedia processing. For this reason, there has been proposed a processing instruction whereby, in fixed-point processing of signed numbers, a multiplication result is shifted to the left by 1 bit and the position of the fixed point is restored. For details, refer to U.S. Pat. No. 5,754,456.

In the case of a constant that can have only a positive value, there is raised a problem that the precision of the absolute value is degraded by 1 bit. With the method described above, this problem is unsolved. In addition, since this method requires a shift operation, its implementation is difficult and the latency increases. With the rising operating frequency of recent more difficult to implement a processing unit with a complex function having a latency within one machine cycle. A latency of 2 to 3 or even more machine cycles may be required. As a result, multiply-addition for cumulatively adding results becomes more and more difficult to implement by using a processor with a low throughput. An example of such multiply addition is:

$A \leftarrow A+X[1] \times Y[1]$, $A \leftarrow A+X[2] \times Y[2]$,

- - -

$A \leftarrow A+X[n] \times Y[n]$

Several problems raised in actual applications are also revealed in a document describing the four combination types of multiplication, that is, the two conventional combination types of multiplication, namely, the multiplication of signed numbers and the multiplication of unsigned numbers, and the two new combination types of multiplication, namely, the multiplication of a signed multiplicand by an unsigned multiplier and the multiplication of an unsigned multiplicand by a signed multiplier. If information indicating whether or not a number has a sign is included in the numerical data of the number, for example, the degree of precision to express the numerical value of the number is decreased. If information indicating which type of multiplication is to be taken is included in a multiply instruction, on the other hand, the instruction requires a field of 2 bits for describing such information. For a processor with a limited number of instruction definition fields, addition of such a field will raise a problem of an unavoidable need to replace another usable instruction with a multiplication instruction including such information.

SUMMARY OF THE INVENTION

It is thus an object of the present invention addressing the problems described above to provide a multimedia multiply-adder having an instruction which allows a signed number to be multiplied by an unsigned number at a high speed.

It is another object of the present invention to provide a multimedia processor that allows a multiply-addition to be carried out at a high speed.

Other objects and novel characteristics of the present invention will become apparent from the description in the specification and the acccompanying drawings.

Several aspects of the invention disclosed in the present application are outlined below.

In order to implement fixed-point processing without degrading the critical processing precision in a multimedia multiply-adder, the present invention provides a means for implementing a technique of multiplying numbers of two different types, that is, multiplying a signed number by an unsigned number. In the case of a multimedia application, either the multiplicand X or the multiplier Y in a multiplication of X×Y is a constant or a coefficient from the beginning. Referring to FIG. 2, since a constant can be treated as a positive or unsigned number, in the multiplication of numerical data 10 having a sign 11 by a constant 20 having no sign it is not necessary to shift the position of the sign bit 31 of the result 30. Thus, a 1-bit left-shift register like one shown in FIG. 2 is not required. In addition, since all bits of the constant 20 shown in FIG. 1 are valid, the sign bit 21 for making the constant 20 of FIG. 2 a signed number is not required. Thus, the precision degradation due to an insufficiency of 1 bit is avoided.

Therefore, in the execution of an operation $A \leftarrow A \pm X \times Y$ in the multimedia multiply-adder, instead of carrying out a multiplication X*Y and then cumulatively adding the product obtained as a result of the multiplication to the cumulative sum A as is the case with the conventional technique, the multimedia multiply-adder is provided with a means for starting an addition or a subtraction at the same time as the execution of the multiplication X×Y in order to carry out the operation $A \leftarrow A \pm X \times Y$ at a high speed. To be more specific, the multimedia multiply-adder is provided with a counter for counting the number of "1" digits in the cumulative term and the partial-product term of the multiplication so that the multimedia multiply-adder can be implemented by as few gate stages as possible.

In addition, the multimedia multiply-adder is also provided with a means for continuing the multiply-addition/subtraction to the next machine cycle by using a multiply-addition/subtraction result with a prior-carry-save state maintained as it is before propagation of a current carry in order to allow continuous processing to be carried out at one throughput. With aplurality of instructions issued consecutively one after another, data dependence among the infractions is analyzed before carrying out the next operation by using a processing result obtained in the preceding operation. In this case, a processing result stored in a latch with a carry saved is passed on to the next operation.

Adoption of an SIMD configuration is considered to be effective in order to carry out picture processing with a high degree of efficiency. In the SIMD configuration, a register 310 is divided into 4 fields 10, 11, 12 and 13 each having a size of n bits as shown in FIG. 3. By the same token, a register 320 is divided into 4 fields 20, 21, 22 and 23 each having a size of n bits. Thus, a multiply-addition (2n+n× n→2n bits) or (n+n×n→n bits) can be carried out concurrently by using the 4 fields of each of the registers 310 and 320 at the same time.

As another technique adopted in a multiply-addition of picture processing, a pair of an addition and a subtraction referred to as butterfly processing is often carried out on a multiplication result. Thus, an instruction for carrying out an operation $A \leftarrow A \pm X \times Y$ with a 1-bit left shift is convenient. Referred to as a multimedia multiply-adder, a processing unit capable of executing this processing instruction is taken into consideration.

BRIEF DESCRIPTION OF THE DRAWINGS

FIG. 5 is a diagram showing a processing scheme of the multimedia multiply-adder capable of assuring processing precision;

FIG. 6 is a diagram showing a logic circuit of a 7-3 counter;

Figure 10:
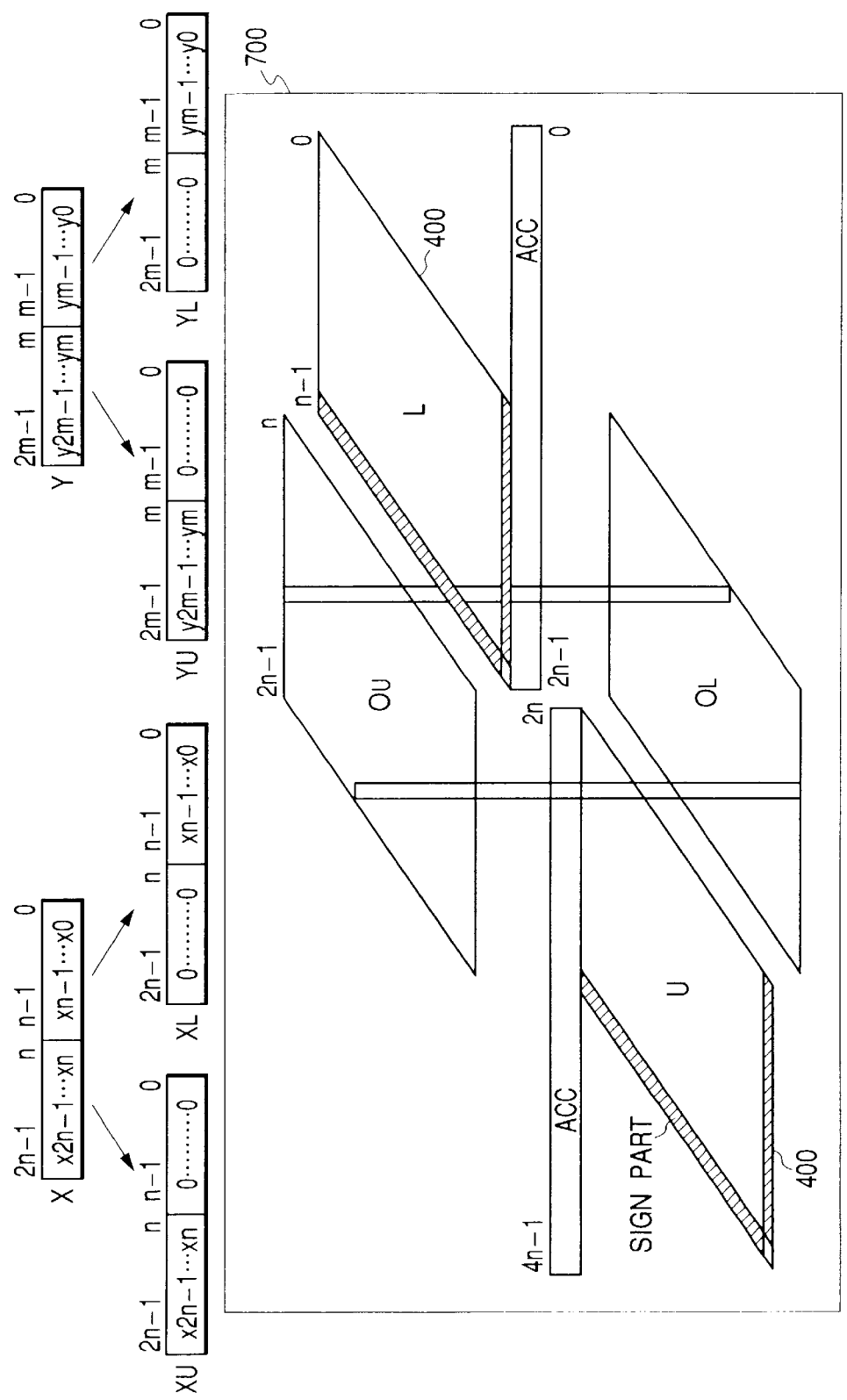
Figures 11, 11A:
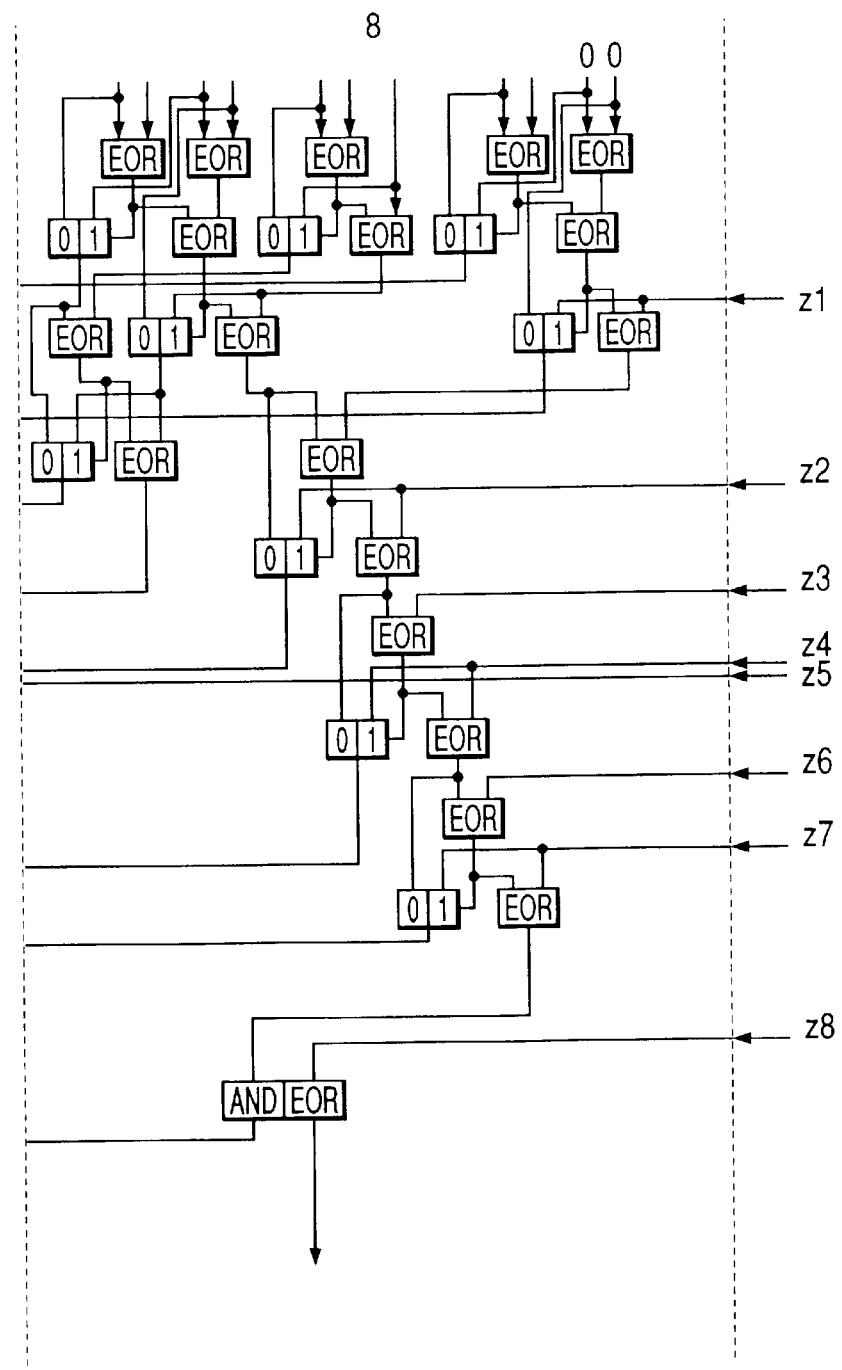
Figure 11B:
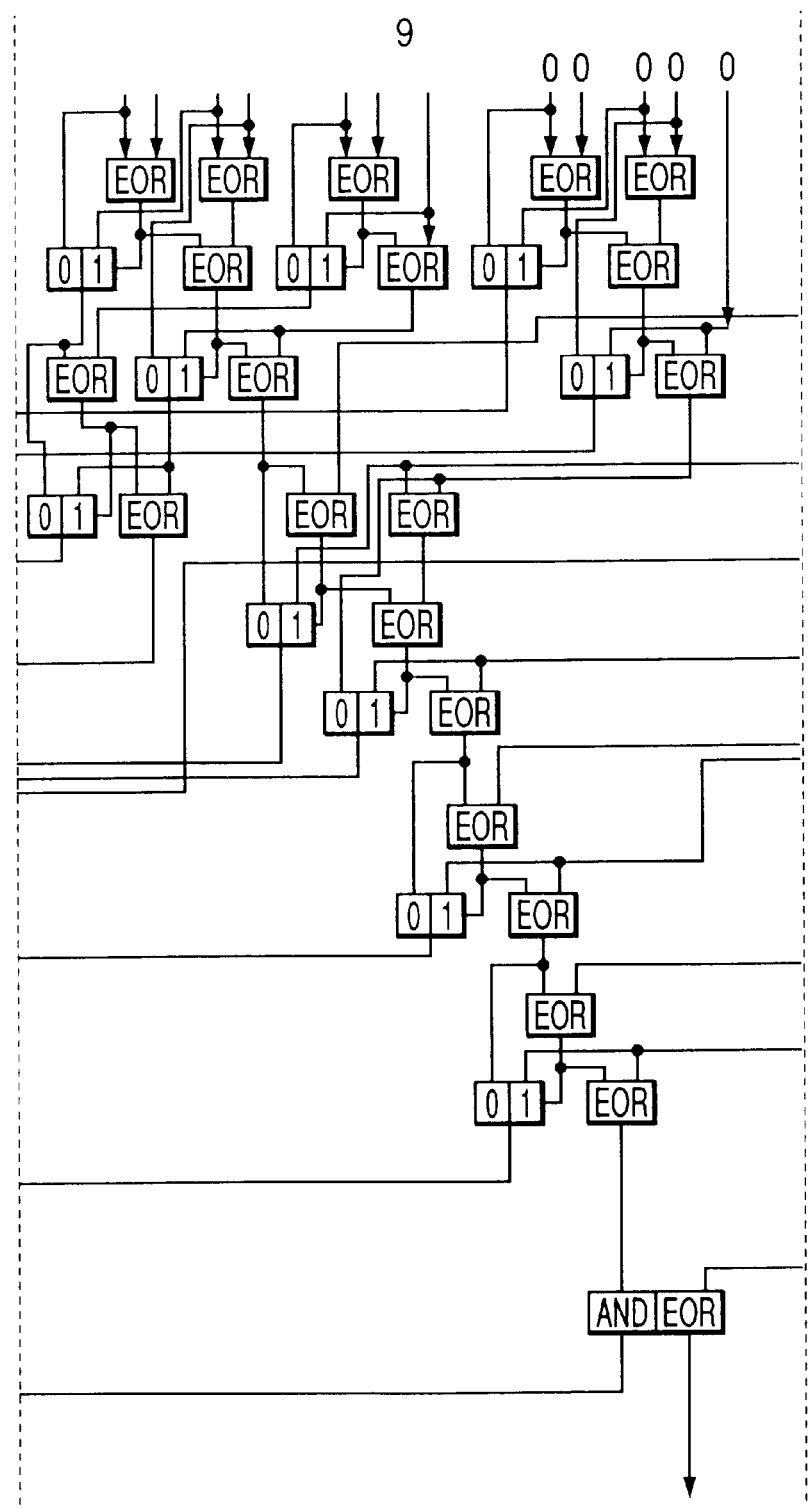
Figure 11C:
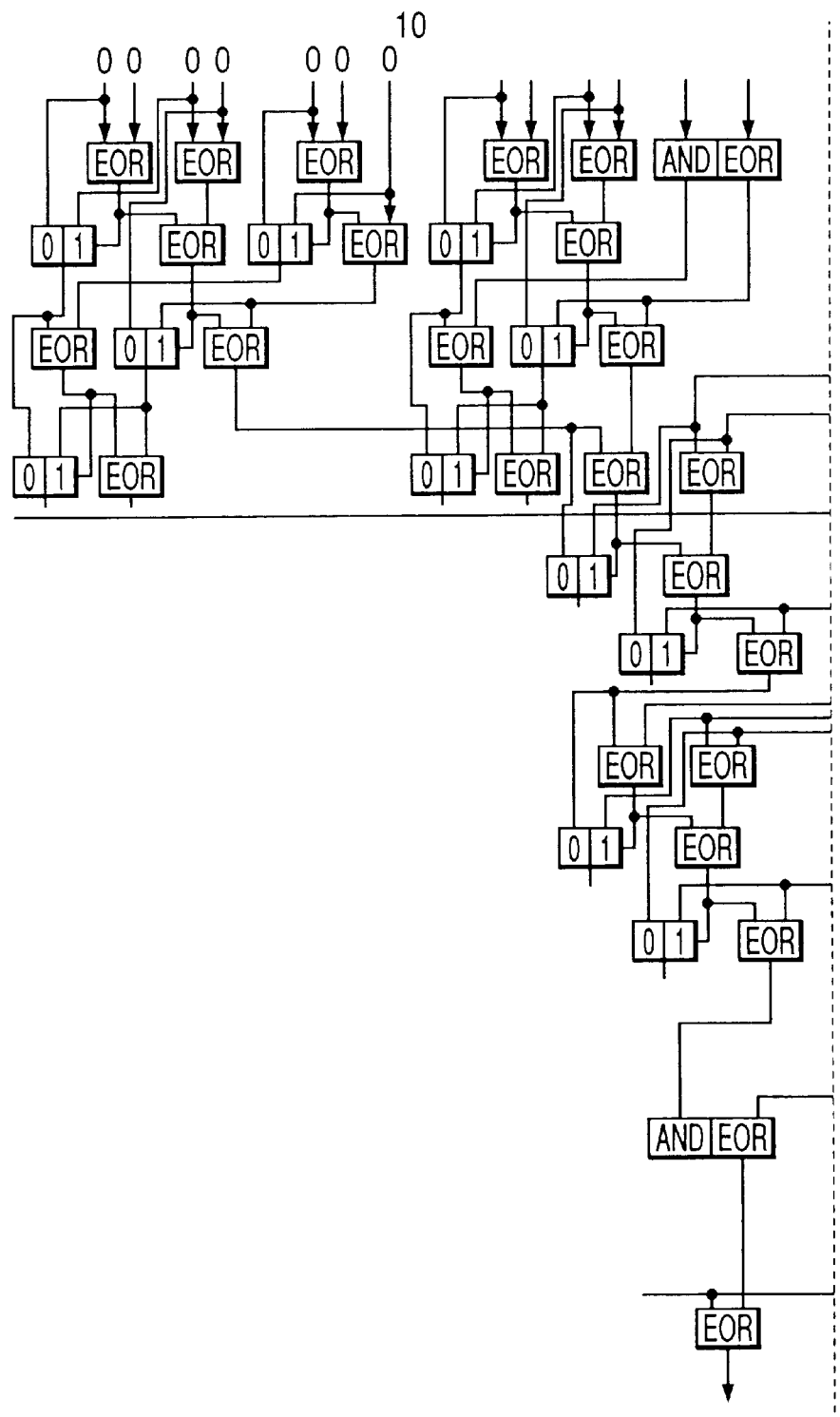
Figure 12:
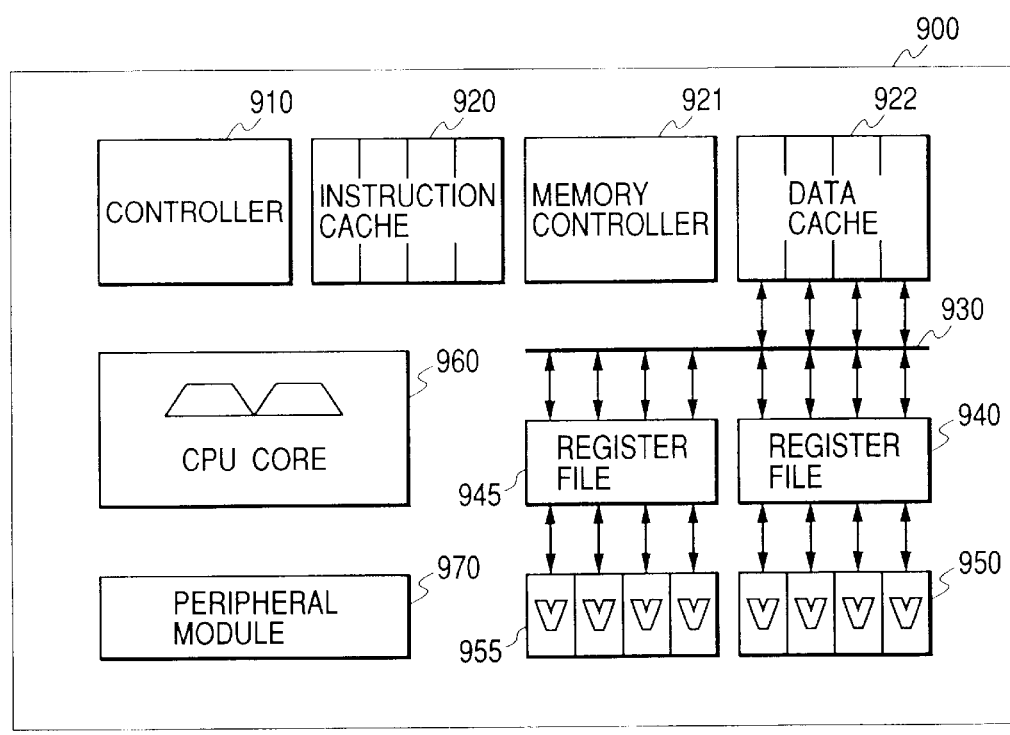

100 for processing 8 bits×9 bits→16 bits wherein a plurality of high-order digits are supplied in a carry-save state;

FIG. 10 is a diagram showing how to configure a hierarchical division parallel processing multimedia multiply adder;

FIG. 11 is a diagram showing a detailed logic circuit forming a part of the configuration of a hierarchical division parallel processing multimedia multiply adder; and FIG. 12 is an overall block diagram showing a microprocessor chip to which the present invention is applied.

DETAILED DESCRIPTION OF THE PREFERRED EMBODIMENTS

First of all, the configuration of a multimedia multiply-adder provided by the present invention is explained with reference to FIG. 5 which shows an addition scheme of a partial product in an addition or a subtraction of a signed result of multiplication 8×9→16 bits to or from a cumulative result with a size of 16 bits. A symbol xiyj denotes a product xi*yj. The products xiyj are summed using AND gates. A line drawn above the symbol xi indicates an inverted value of xj. The following description explains how the addition scheme of a partial product shown in FIG. 5 is derived.

A signed number is expressed in a 2's complement format. Now, consider an m-bit multiplicand Y(m)=ym−1 - - - y1 y0 and an n-bit multiplier X(n)=xn−1 - - - x1x0 expressed in the 2's complement format. The multiplier X(n) and the multiplicand Y(m) are expressed as follows:

$$X(n) = -x_{n-1}2^{n-1} + \sum_{i=0}^{n-2} x_i 2^i \qquad (1)$$

$$Y(m) = -y_{m-1}2^{m-1} + \sum_{i=0}^{m-2} y_i 2^i. \qquad (2)$$

A product X*Y=pm+n−2 - - - p1p0 is obtained as follows:

$$X \times Y = x_{n-1}y_{m-1}2^{m+n-2} + \sum_{i=0}^{n-2}\sum_{j=0}^{m-2} x_i y_j 2^{i+j} - \qquad (3)$$

$$y_{m-1}2^{m-1} \cdot \sum_{i=0}^{n-2} x_i 2^i - x_{n-1}2^{n-1} \cdot \sum_{i=0}^{m-2} y_i 2^i.$$

Each of negative terms in the expression of Eq. (3) can be expressed as follows:

$$-\sum_{k=0}^{j-2} a_k 2^k = -2^{j-1} + 1 + \sum_{k=0}^{j-2}(1-a_k)2^k = -2^{j-1} + 1 + \sum_{k=0}^{j-2} \overline{a}_k 2^k \qquad (4)$$

where a line drawn above a symbol ak indicates an inverted value of ak, that is, the value of (1−ak). By using this property, Eq. (3) can be rewritten as follows:

$$X \times Y = x_{n-1}y_{m-1}2^{m+n-2} + \qquad (5)$$

$$\sum_{i=0}^{n-2}\sum_{j=0}^{m-2} x_i y_j 2^{i+j} + y_{m-1}2^{m-1}\left(-2^{n-1} + 1 + \sum_{i=0}^{n-2} \overline{x}_i 2^i\right) +$$

$$x_{n-1}2^{n-1}\left(-2^{n-1} + 1 + \sum_{i=0}^{m-2} \overline{y}_i 2^i\right)$$

Let Y+(m−1) be expressed as follows:

$$Y^+(m-1) = \sum_{i=0}^{m-2} y_i 2^i \qquad (5\text{-}1)$$

The following equation also holds true:

$$Y^+ = -2^{m-1} + 1 + \sum_{i=0}^{m-2} \overline{y}_i 2^i \qquad (5\text{-}2)$$

For ym−1=1 and i=0 to m−2 in Eq. (5), the following replacement is valid:

$$y_i \leftarrow \overline{y}_i \qquad (5\text{-}3)$$

Thus, under a further condition of ym−1=2, the multiply-subtraction (−X*Y+) can be found by the following addition:

$$X(n) = -x_{n-1}2^{n-1} + \sum_{i=0}^{n-2} x_i 2^i \qquad (5\text{-}4)$$

In this way, in the processing scheme of the multiply-addition/subtraction instruction (A←A±X*Y), the result is obtained by adding or subtracting the result of the multiplication X*Y to or from the cumulative result A(n+m−2)=an+ m−2 - - - a1a0 as shown in FIG. 5. FIG. 5 shows an example for n=8 and m=9. As is obvious from FIG. 5 and Eq. (5), at the position of bit 15, (x7+x8) is subtracted from x7y8 (x7y8−(x7+x8)) to give−(x7 V x8) where the symbol V represents logical addition. By the same token, at the position of bit 7, x7y8 is subtracted from x7 to give x7y8/:

$$x_7 - x_7 y_8 = x_7 \overline{y}_8 \qquad (6)$$

Figure 1:
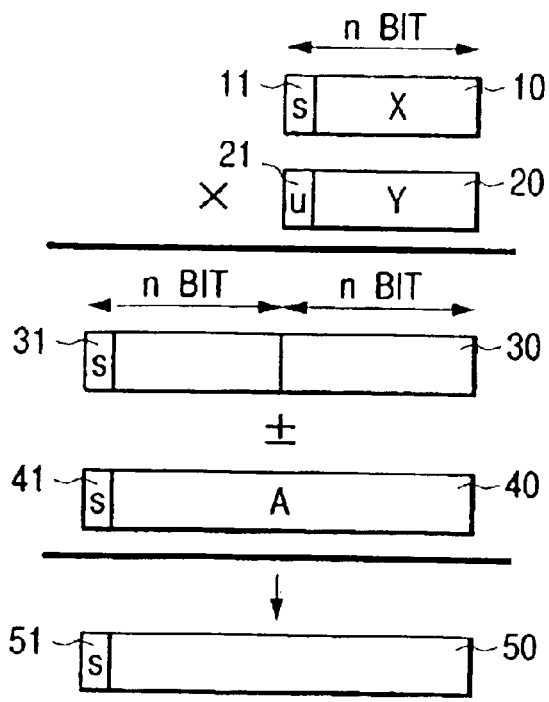
FIG. 1 is a diagram showing a multiply-addition/subtraction system for computing an expression (signed number)±(signed number)×(unsigned number)
Figure 2:
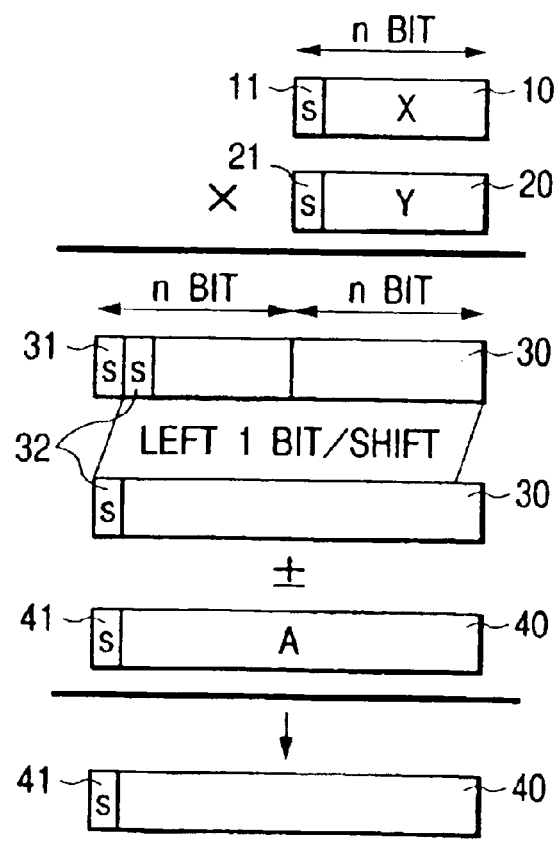
FIG. 2 is a diagram showing a multiply-addition/subtraction system for computing an expression (signed number)±(signed number)×(signed number)

Based on the addition scheme described above, the multiply-addition shown in FIG. 1 is explained. FIG. 1 is a diagram showing the concept of the present invention. In the figure, reference numeral 10 is a number having a length with a size of 16 bits and a sign bit 11. On the other hand, reference numeral 20 is an unsigned number having a size of 16 bits. In the multimedia processing or the like, a signed number is picture data and unsigned data is a cosine number. A result obtained from a multiplication of the signed number 10 by the unsigned number 20 is a product 30. As described above, a product obtained as a result of a multiplication of a number with a size of 16 bits by a number with a size of 16 bits has a size of 32 bits. In the case of a multiplication of a signed number by an unsigned number, however, the product 30 has only 1 sign bit 31 as shown in FIG. 1 instead of having 2 sign bits at the beginning thereof as shown in FIG. 2. In execution of multimedia multiply-addition, it is necessary to compute a numerical value 50 as a result of the multiply-addition/subtraction by adding or subtracting the result 30 of the above multiplication to or from a numerical value 40 which has been stored as a cumulative result. The numerical value 50 is a result of addition or subtraction of the multiplication result 30 to or from the cumulative result 40 and stored as a new cumulative result 40. The operation to add or subtract a multiplication result to or from a cumulative result and store the result of the addition or the subtraction as a new cumulative result is referred to as a cumulative addition or a cumulative subtraction respectively. In this case, the cumulative result 40 is a numerical value having 1 sign bit 41. Thus, when the multiplication result 30 similarly having 1 sign bit 31 is added to or subtracted from the cumulative result 40, it is not necessary to shift the numerical value 30 by 1 bit like the operation shown in FIG. 2. That is, since the multiplication result 30 can be added to or subtracted from the cumulative result 40 without carrying out the extra shift operation, the extra configuration for the shift operation is not required and the processing can be performed at a higher speed.

Next, FIG. 12 shows a microprocessor 900 provided with an embedded multiply-adder/subtractor implementing the present invention and used for carrying out multimedia processing. Built as a single semiconductor chip, the microprocessor 900 comprises:

an instruction cache 920 for storing a program to be read out at a high speed;

a data cache 922 allowing data to be written therein at a high speed and allowing data already stored therein to be read out also at a high speed;

a memory control unit 921 for controlling the instruction cache 920 and the data cache 922;

processing units 950 and 955 each comprising a plurality of processing sub-units with typically the same plurality of types for carrying out processing;

register files 940 and 945 for supplying and receiving data to and from the processing units 950 and 955 respectively;

a CPU core 960 for reading out instructions composing the program from the instruction cache 922 and decoding the instructions;

a control unit (controller) 910 for outputting control signals to the entire microprocessor 900 in accordance with a result of instruction decoding; and a peripheral controller (peripheral module) 970 for controlling peripherals.

There are a variety of instructions to be executed by a microprocessor like the microprocessor 900. The microprocessor 900 provided by the present invention is adapted to instructions for execution of a discrete cosine operation as part of multimedia processing and instructions for carrying out multiply-additions/subtractions on signed as well as unsigned numbers. The microprocessor 900 can be a CISC processor for executing variable-length instructions even though the microprocessor 900 does not have to be a CISC processor in particular. As an alternative, the microprocessor 900 can be a RISC processor for executing fixed-length 16-bit and 32-bit instructions or a mix of 16-bit and 32-bit instructions.

Figure 3:
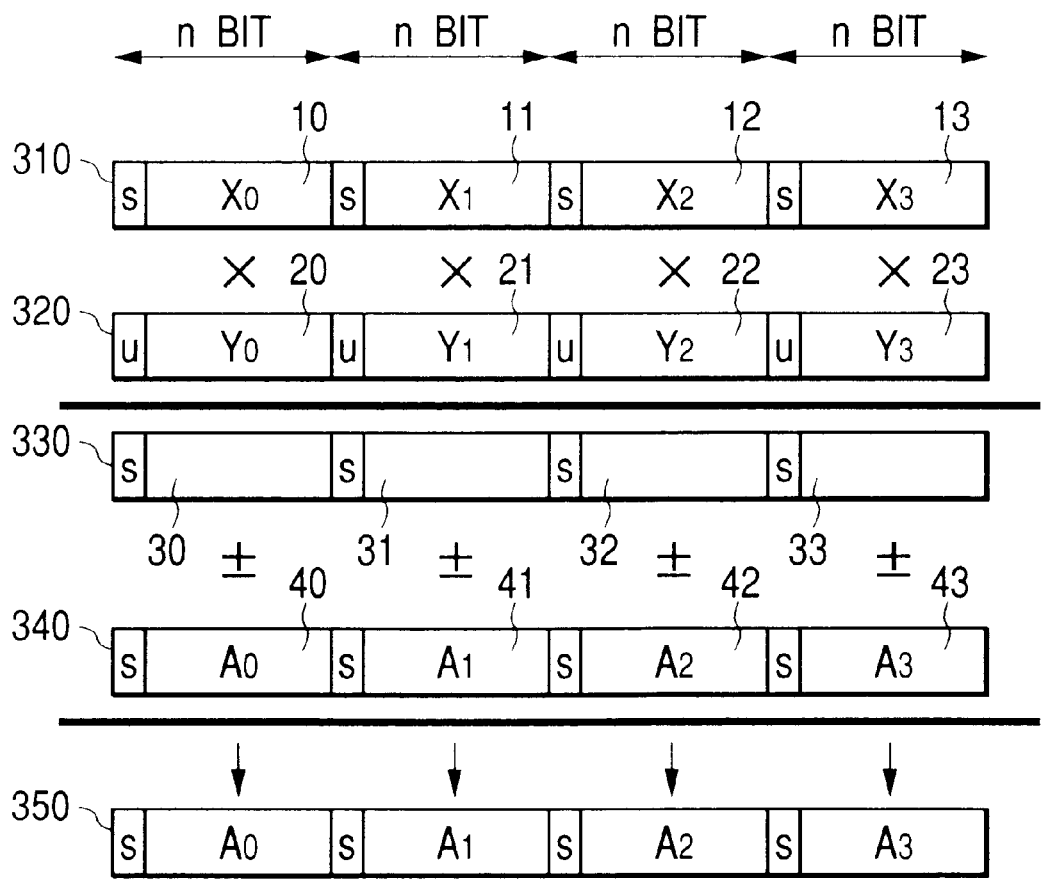
FIG. 3 is a diagram showing a 4-division parallel processing system to implement multiply-addition/addition for computing an expression (signed number)±(signed number)×(unsigned number)

In addition, the microprocessor 900 shown in FIG. 12 can have an embedded processing unit comprising processing sub-units and, in order to carry out signal processing and multimedia processing at a high speed, input/output data of the processing unit is divided into a plurality of bit blocks each having a required size not exceeding half the original size of the data, and the blocks are processed by the processing sub-units concurrently. In general, such a processing means is referred to as an SIMD mechanism. The mechanism of a multiply-adder in an application of the present invention to the SIMD mechanism is explained by referring to FIG. 3. This figure is a diagram showing a multiply-adder for a case in which the entire input/output data 310 is divided into 4 blocks of bits 10, 11, 12 and 13 even though the scope of the present invention is not limited to such a multiply-adder in particular. The pieces of numerical data 10, 11, 12 and 13 each have a size of n bits including a sign bit. Data 320 is also divided into pieces of numerical data 20, 21, 22 and 23 each having a size of n bits including no sign bit. In the SIMD mechanism, the pieces of signed numerical data 10, 11, 12 and 13 are multiplied by the pieces of unsigned numerical data 20, 21, 22 and 23, respectively. As described above, the result of a multiplication of a numerical value with a size of 16 bits including a sign bit by a numerical value with a size of 16 bits including no sign bit is a numerical value with a size of 32 bits including a sign bit. In the case of the embodiment shown in FIG. 3, only 16 high-order bits of the 32-bit multiplication result are extracted. The 16 extracted bits comprise 4 pieces of data 30, 31, 32 and 33 which are added to or subtracted from already stored cumulative results 40, 41, 42 and 43 respectively. The results of the addition or the subtraction or, strictly speaking, the results of the cumulative addition or the cumulative subtraction, are stored as new cumulative results. Also in this case, since the result of a multiplication of a numerical value with a sign bit by a numerical value including no sign bit is a numerical value including a sign bit, it is not necessary to shift the result by 1 bit like the conventional technique, and a configuration for implementing a shift operation is also not required. As a result, the processing can be carried out at a high speed. This embodiment adopts a technique whereby four pieces of data each having a size of n bits including a sign bit are multiplied concurrently by four pieces of data each having a size of n bits including no sign bit respectively to result in four pieces of data each rounded to n bits including a sign bit. The four results of multiplication each rounded to n bits are then added to or subtracted from respectively four cumulative results each having a size of n bits including a sign bit to give four new cumulative results each having a size of n bits including a sign bit. It should be noted, however, that the scope of the present invention is not limited to this embodiment. As an alternative, for example, data being processed can also be divided into two blocks subjected to concurrent processing. In this alternative embodiment, two pieces of data each having a size of 2n bits including a sign bit are multiplied concurrently by two pieces of data each having a size of 2n bits including no sign bit respectively to result in two pieces of data each rounded to 2n bits including a sign bit. The two results of multiplication each rounded to 2n bits are then added to or subtracted from respectively two cumulative results each having a size of 2n bits including a sign bit to give two new cumulative results each having a size of 2n bits including a sign bit. The processing speed of this alternative technique is slow in comparison with the embodiment shown in FIG. 3. Nevertheless, the processing precision is better than the embodiment shown in FIG. 3. As another alternative, four pieces of data each having a size of n bits including a sign bit are multiplied concurrently by four pieces of data each having a size of n bits including no no sign bit respectively to result in four pieces of data each having a size of 2n bits including sign bits. Without being rounded to n bits, the four results of multiplication each having a size of 2n bits are then added to or subtracted from respectively four cumulative results each having a size of 2n bits including sign bits to give four new cumulative results each having a size of 2n bits including sign bits. The speed of the concurrent addition or the subtraction and, hence, the speed of processing according to this other alternative embodiment are slow in comparison with the embodiment shown in FIG. 3. Nevertheless, the processing precision of the addition or the subtraction is better than the embodiment shown in FIG. 3.

A plurality of embodiments have been explained so far. According to the present invention, a signed number is multiplied by an unsigned number to give a multiplication result including only 1 sign bit. The multiplication result including 1 sign bit is added to or subtracted from a cumulative result including 1 sign bit to provide a new cumulative result including 1 sign bit. An operation to shift the multiplication result is not required during the multiply-addition/subtraction processing. Thus, a means and a time for implementing the shift operation are also not required. In addition, to put it concretely, by utilizing the multiply-addition/subtraction described above in multimedia processing and, in particular, by utilizing the multiply-addition/subtraction described above in discrete cosine processing, it is possible to provide a microprocessor that has a high processing performance in comparison with the conventional microprocessor and can be used in multimedia processing at a high efficiency. Furthermore, it is an object of the present invention to provide a microprocessor having an instruction for carrying out the multiplication and the addition or the subtraction described above as batch arithmetic processing. It should be noted, however, that the scope of the present invention is not limited to such a microprocessor. The scope of the present invention does not exclude changes and modifications of the microprocessor and the processing unit as long as the changes and the modifications do not deviate from the basic principles of the present invention.

Figure 4:
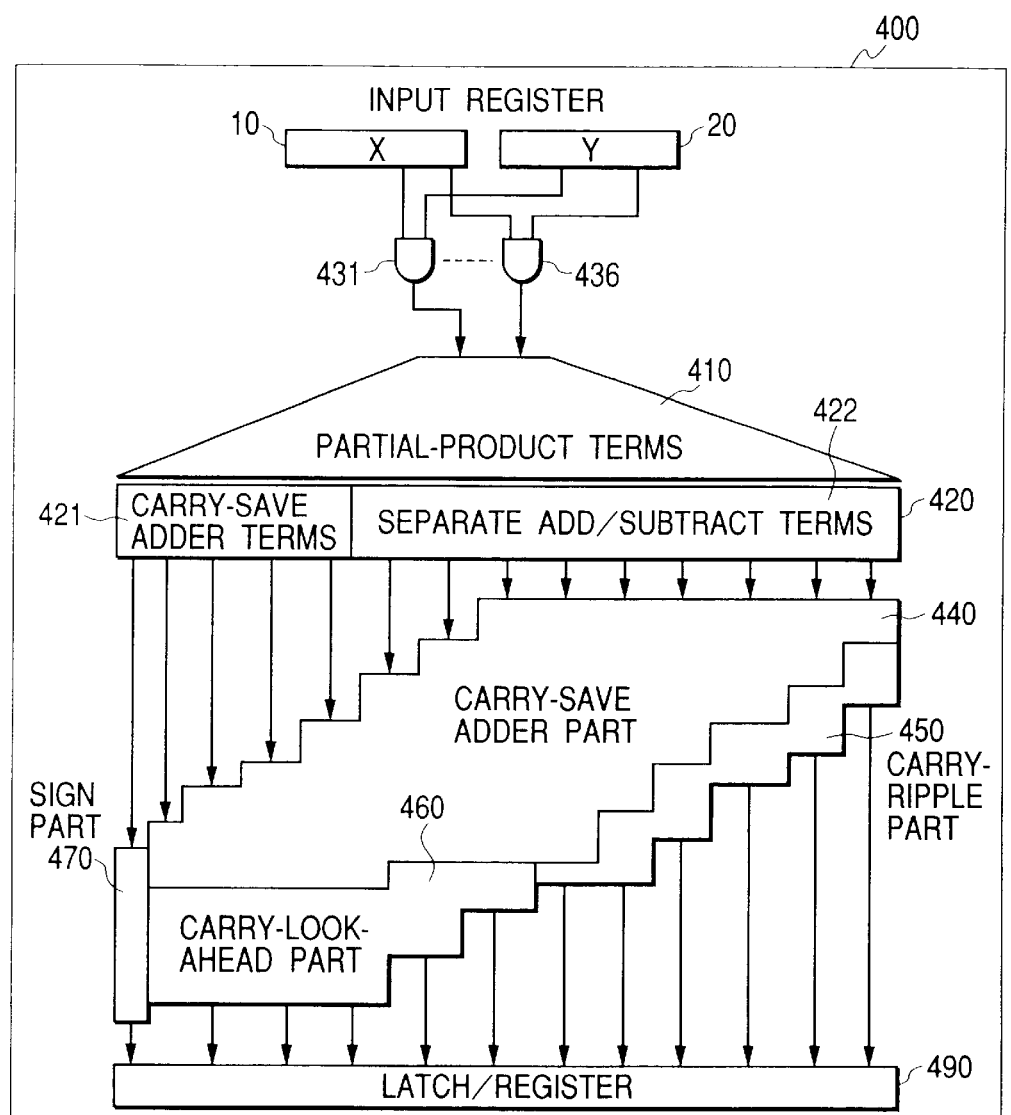
FIG. 4 is a diagram showing the configuration of a multimedia multiply-adder capable of assuring processing precision.

FIG. 4 is a block diagram showing the configuration of a multimedia-multiply adder 400 implementing the present invention. First of all, a multiplier X is stored into an input register 10 and a multiplicand Y is stored in an input register 20. Then, products xiyj output by a plurality of AND gates 431 to 436 are supplied to their respective digit positions of a partial-product input unit 410. Input counts supplied to the digit positions are shown in FIG. 5. A latch 490 is used for simultaneously storing a result cumulated so far as addition terms ai (denoted by reference numeral 420).

The following description explains how to count the value of the product xiyj supplied to each digit position and the cumulative product ak, and how to transfer a carry to an upper-order digit. As is apparent from the values of the input counts shown in FIG. 5, the numbers to be counted are large at middle digit positions and become smaller at side digit positions. Thus, the numbers to be counted form the so-called inverse trigonometric shape. The number of inputs is counted, first of all, in a carry-save state, that is, by using a carry-save adder in a carry-save unit 440. At lower-order digit positions than the middle digit position, propagation of a carry is completed quickly with completion times resembling a staircase shape. The propagation of the carry is thus sequential carry propagation or ripple propagation 450. In the carry-save unit 440, the carry-save adder gradually reduces an output count for each digit while propagating a carry little by little. As the output count reaches 2, the adder is switched to a carry-look-ahead adder capable of propagating a carry quickly. Since it is desirable to reduce the number of gate stages to as small a value as possible at this stage, there is combined a system whereby the case of a carry propagated from a lower-order digit is distinguished in advance from the case of no carry propagated from a lower-order digit and, when a carry is actually propagated, both are selected. In addition, since there is a time margin for a higher-order digit position relative to the middle digit position to wait for a carry to be propagated from a low-order digit position, a select/look-ahead addition system 460 taking advantage of this time margin is adopted. A highest-order part 470 is a component corresponding to cases of signed and unsigned numbers. A brief description of the block diagram showing the configuration of a multimedia multiply-adder 400 provided by the present invention is completed here.

Next, the configuration of a multimedia multiply-adder 400 provided by the present invention is explained in detail. An input-value counter is designed by using a 7-3 counter 600 shown in FIG. 6 as a basic block. A gate 611 is an EOR (exclusive or) gate and a gate 612 has the function of a selector. The selector 612 receives a control signal from the right side. For a control signal of 0, the selector 612 selects a left input. For a control signal of 1, on the other hand, the selector 612 selects a right input. First of all, the 7-3 counter 600 counts three inputs by using a 3-2 compressor 620, outputting one of the inputs to the one-level higher-order digit and another one of the input to the current digit. The remaining four inputs and the output of the current digit of the 3-2 compressor 620 are supplied to a 4-2 compressor 610 to be counted thereby. The 4-2 compressor 610 supplies two outputs to the one-level higher-order digit and the last output 20 to the current digit. A total of three inputs output to the one-level higher-order digit are counted by a 3-2 compressor 630 which outputs one of the inputs (21) to the one-level higher-order digit and another one of the inputs (22) to the two-level higher-order digit. By outputting one of the inputs (20) to the current digit, another one of the inputs (21) to the one-level higher-order digit and still another one (22) to the two-level higher-order digit in this way, the 7-3 counter 600 is capable of counting the 7 input values while generating a carry with a high degree of efficiency.

Figure 7B:
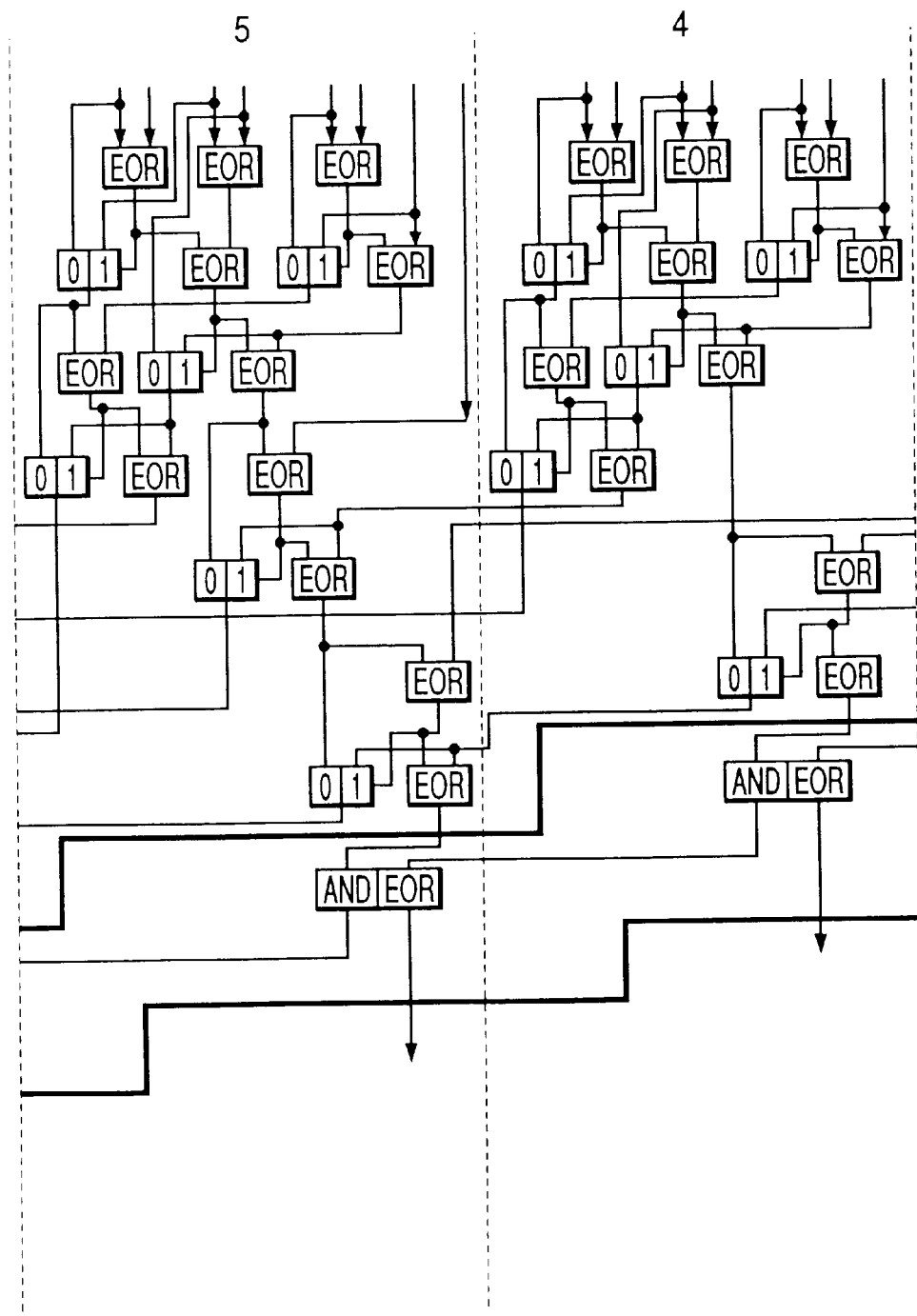
FIG. 7 is a diagram showing a portion for low-order bits 0 to 7 of a logic circuit of a multimedia multiply-adder 100 for processing 8 bits×9 bits→16 bits.
Figure 7C:
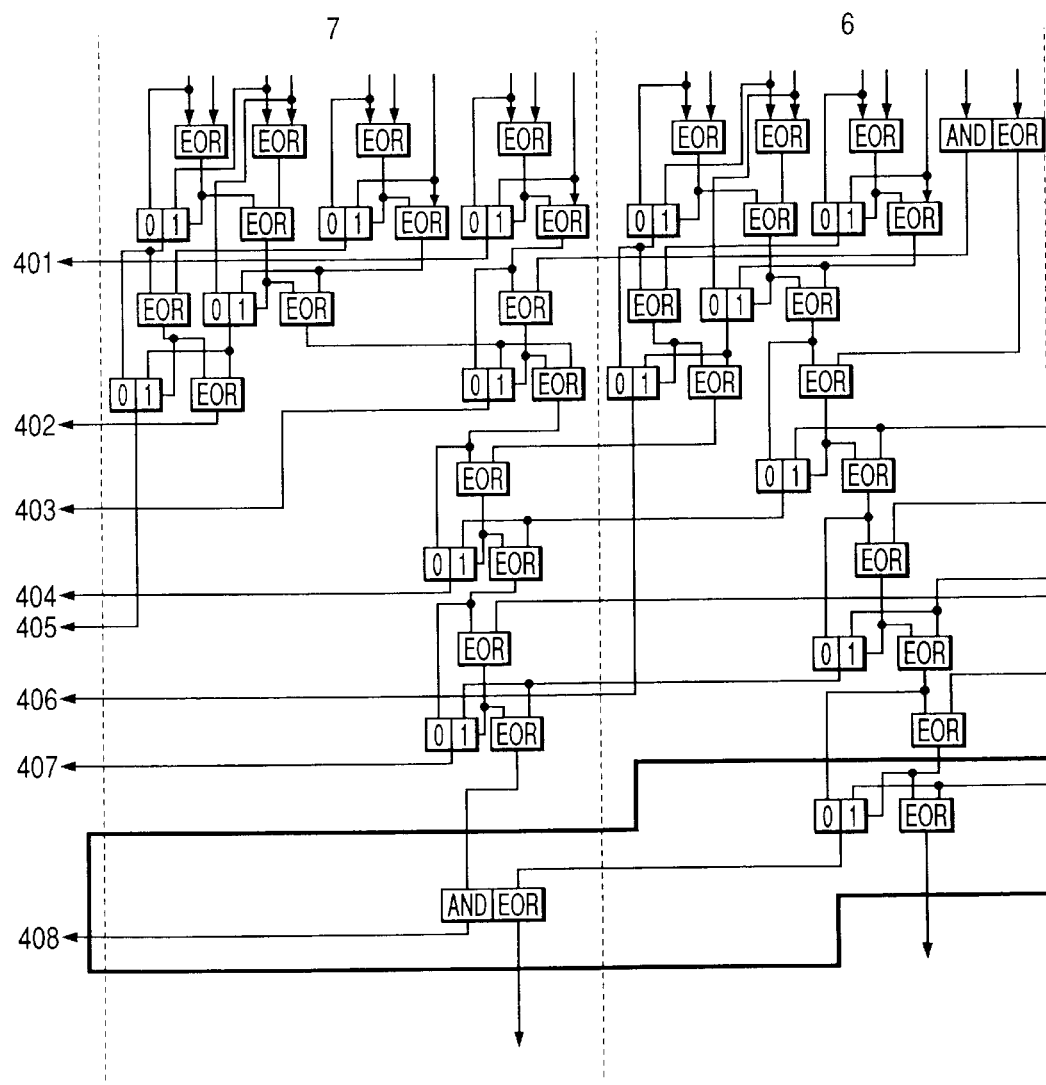
Figures 8, 8A:
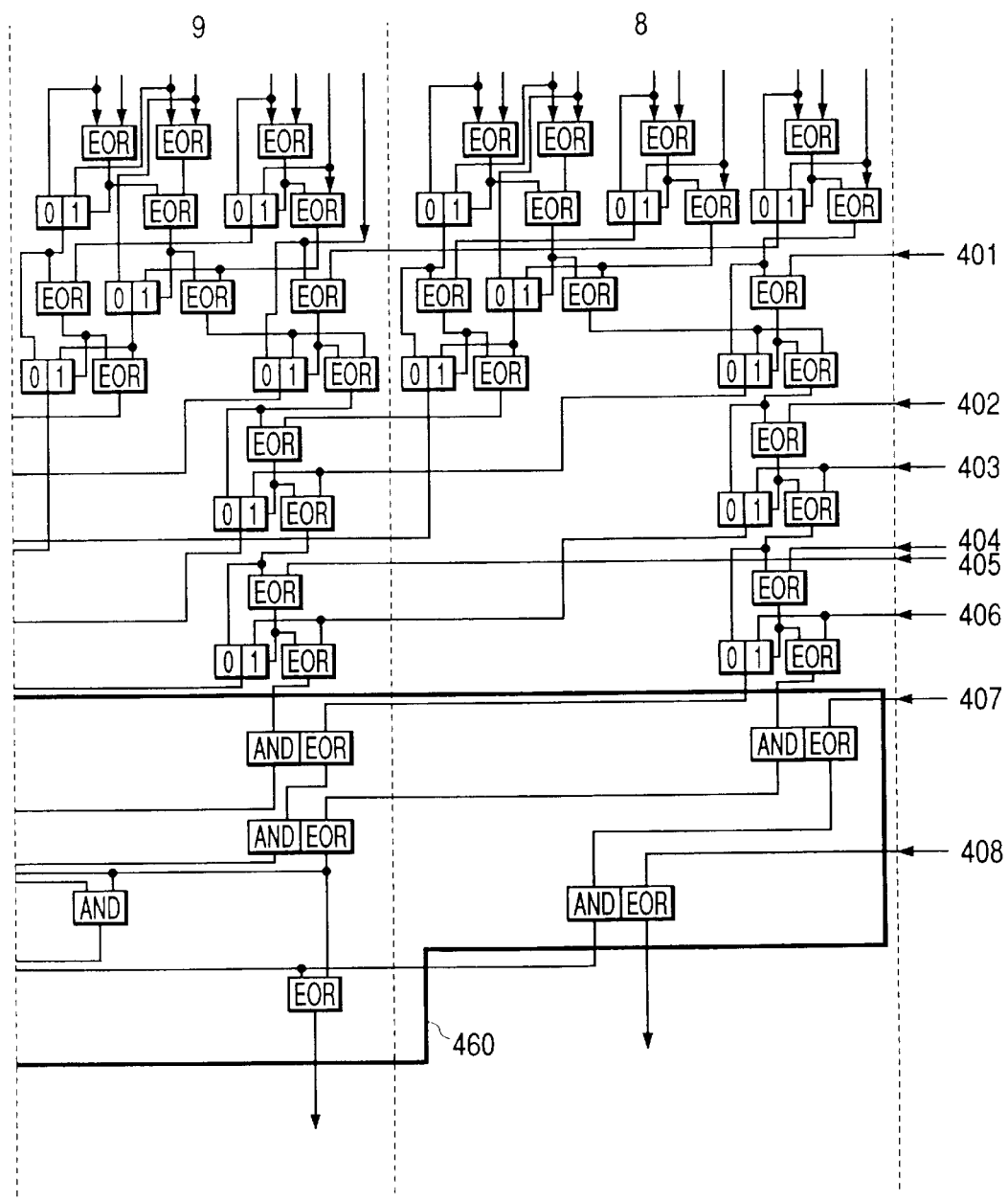
FIG. 8 is a diagram showing a portion for high-order bits 8 to 15 of a logic circuit of the multimedia multiply-adder 100 for processing 8 bits×9 bits→16 bits.
Figure 8B:
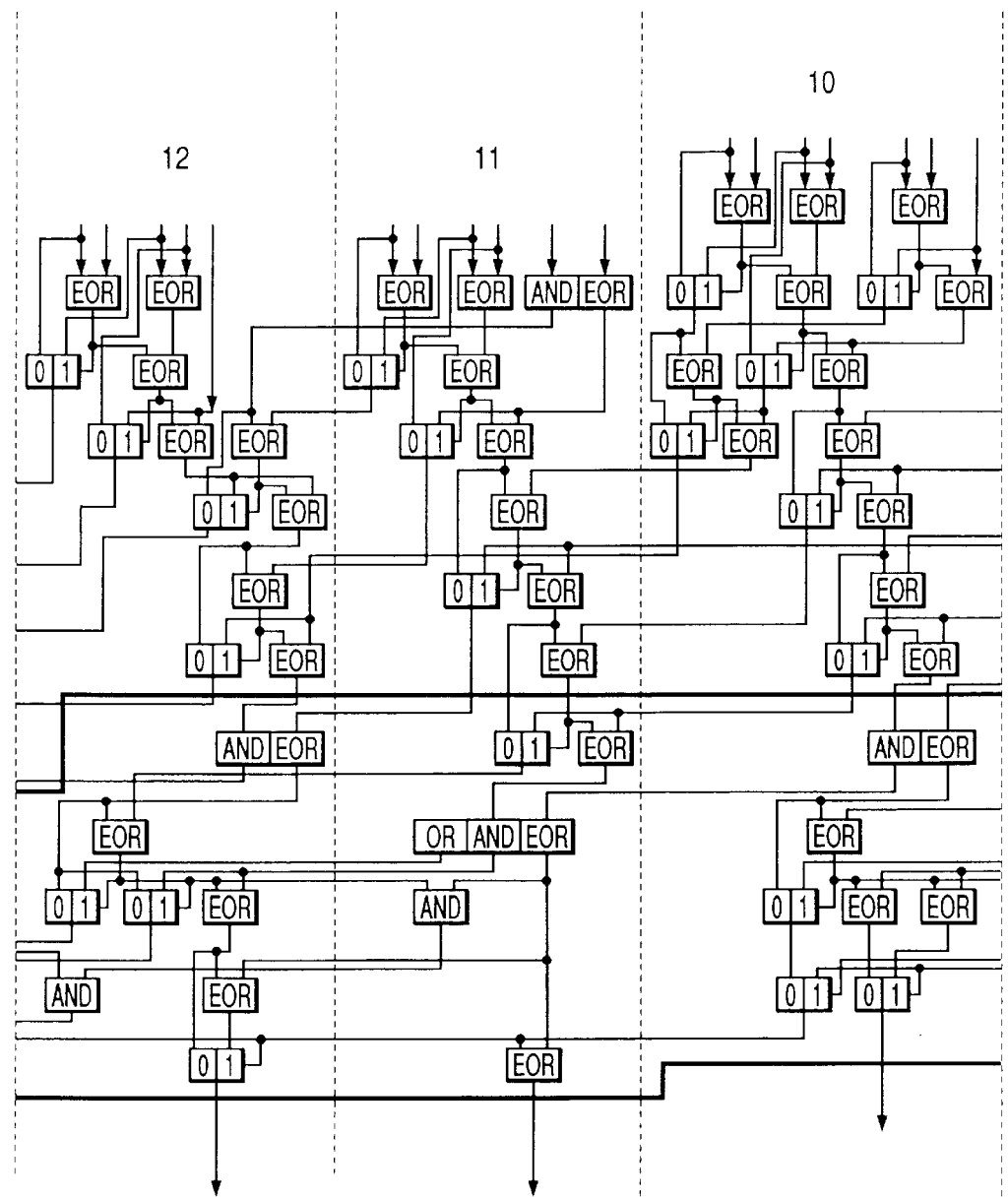
Figure 8C:
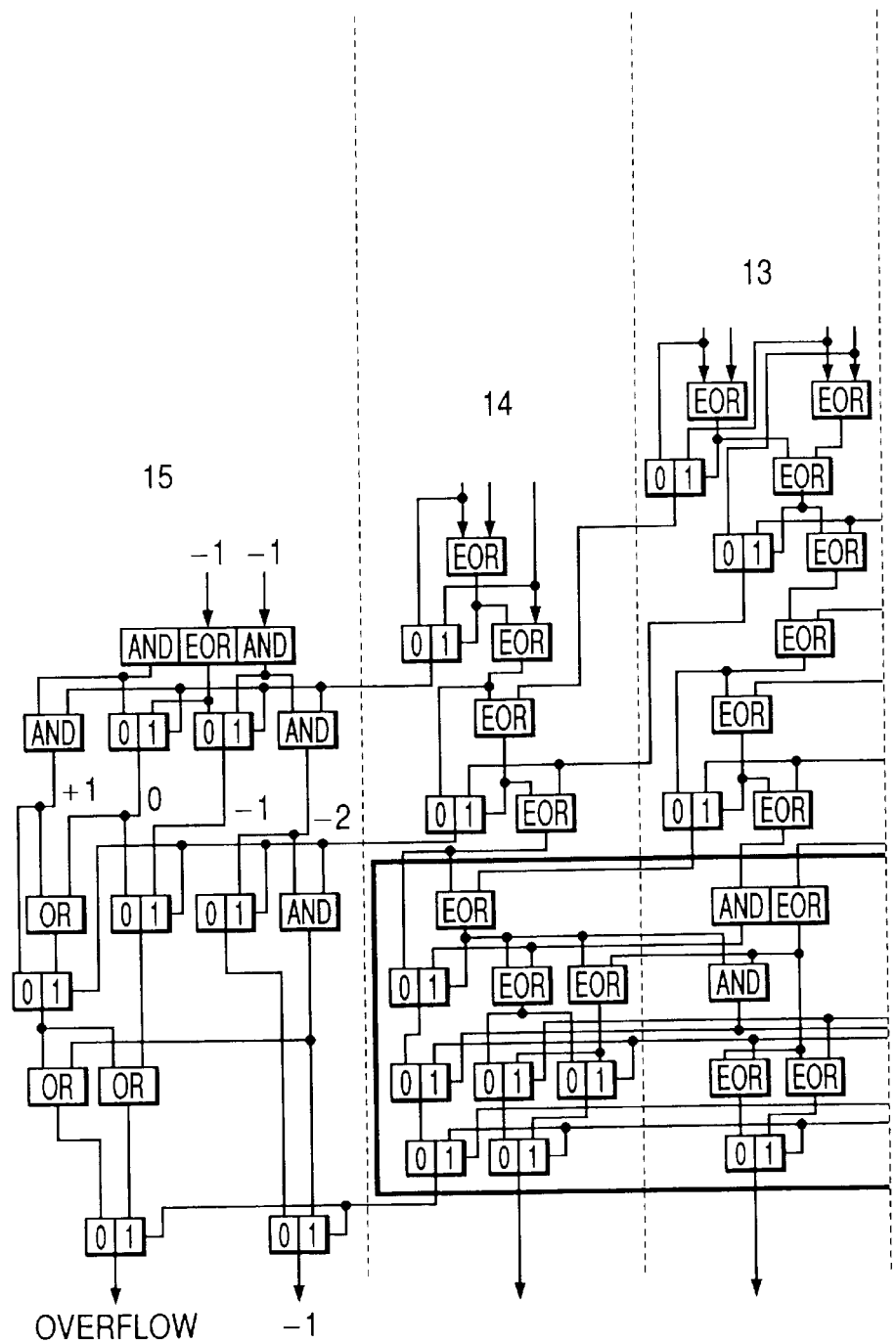

Logic circuits for counting input values of the scheme shown in FIG. 5 digit by digit are shown in FIGS. 7 and 8. The logic circuit shown in FIG. 7 is a logic circuit for bits 0 to 7 and the logic circuit shown FIG. 8 is a logic circuit for bits 8 to 15. A gate can be an AND(logical product) or OR (logical sum) gate in addition to an EOR (exclusive logical sum) gate or a selector. In the first place, when there are 6 or more inputs, the 7-3 counter 600 is basically used. When there are only 6 inputs indicating a fall-short state of 1 input, the 3-2 counter 620 merely functions as a 2-2 counter which is a logic circuit comprising AND and EOR gates. That is, the configuration comprises all but similar logic circuits. The 4-2 and 3-2 compressors and the 2-2 counter are used to optimally handle the remaining states of insufficient inputs. As is apparent from FIG. 5, since the number of inputs on the lower-order digit side is small, the state of FIG. 4 in which the number of outputs eventually becomes two is reached quickly. The number of outputs represents the carry and the digit count. At positions in close proximity to the center shown in FIG. 4, on the other hand, it takes a longest time to reach the state in which the number of outputs eventually becomes two. Thus, the eventual sequential carry propagation from a low-order digit to a position in close proximity to the location at which it takes a longest time to reach the state of the output count eventually becoming two can be carried out as a ripple-type propagation denoted by reference numeral 450 in FIGS. 7 and 4. In order to speed up the propagation of a carry from any location between the position of the middle digit and the position of the most significant digit, carry-look-ahead addition is implemented. In order to reduce the number of gate stages, at a high-order digit, logic circuits are assembled by assuming a case of no propagation of a carry and a case of propagation of a carry from a low-order digit to the high-order digit. Either one of the logic circuits is to be selected in dependence on the actual value of the carry. This technique is referred to as a carry-select/look-ahead method denoted by reference numeral 460 in FIGS. 7 and 4. In addition, the higher the order of a digit, the shorter the time it takes to achieve a state in which the number of outputs eventually becomes two. Thus, faster preparation for computation of carry propagation is considered to be possible. As an alternative, conversely, the following concept is also possible. The higher the order of a digit, the larger the time margin to delay the timing of an input. This is because, the higher the order of a digit, the longer the time it takes to complete propagation of a carry. Thus, when the next multiply-addition/subtraction is carried out after the current one in the case of consecutive multiply-addition instructions, there is a merit that it is possible to take advantage of the fact that, the higher the order of a digit, the larger the time margin usable to delay the timing of an input. That is, after digit position 10, the input timing can be delayed little by little. FIGS. 7 and 8 are diagrams each conceptually showing the time lapse of a signal propagating through the circuit in the vertical direction. That is, signals supplied to their respective gates or the like propagate in the downward direction with the lapse of time. Based on this thinking, in FIG. 8, at digit position 10 and subsequent positions, the positions of inputs are lowered in comparison with the positions preceding them. That is, for digit position 10 and subsequent positions, the figure shows that the input timing of an input signal is delayed in comparison with digit position 9 and digit positions preceding digit position 9. By properly using the characteristic that, for digit position 10 and subsequent positions, the input timing of an input signal is delayed in comparison with digit position 9 and digit positions preceding digit position 9, complete propagation of a carry can be made possible in some cases by delaying an input timing to overlap the next machine cycle even if the current machine cycle is finished before the propagation of a carry is completed.

Figures 9, 9A:
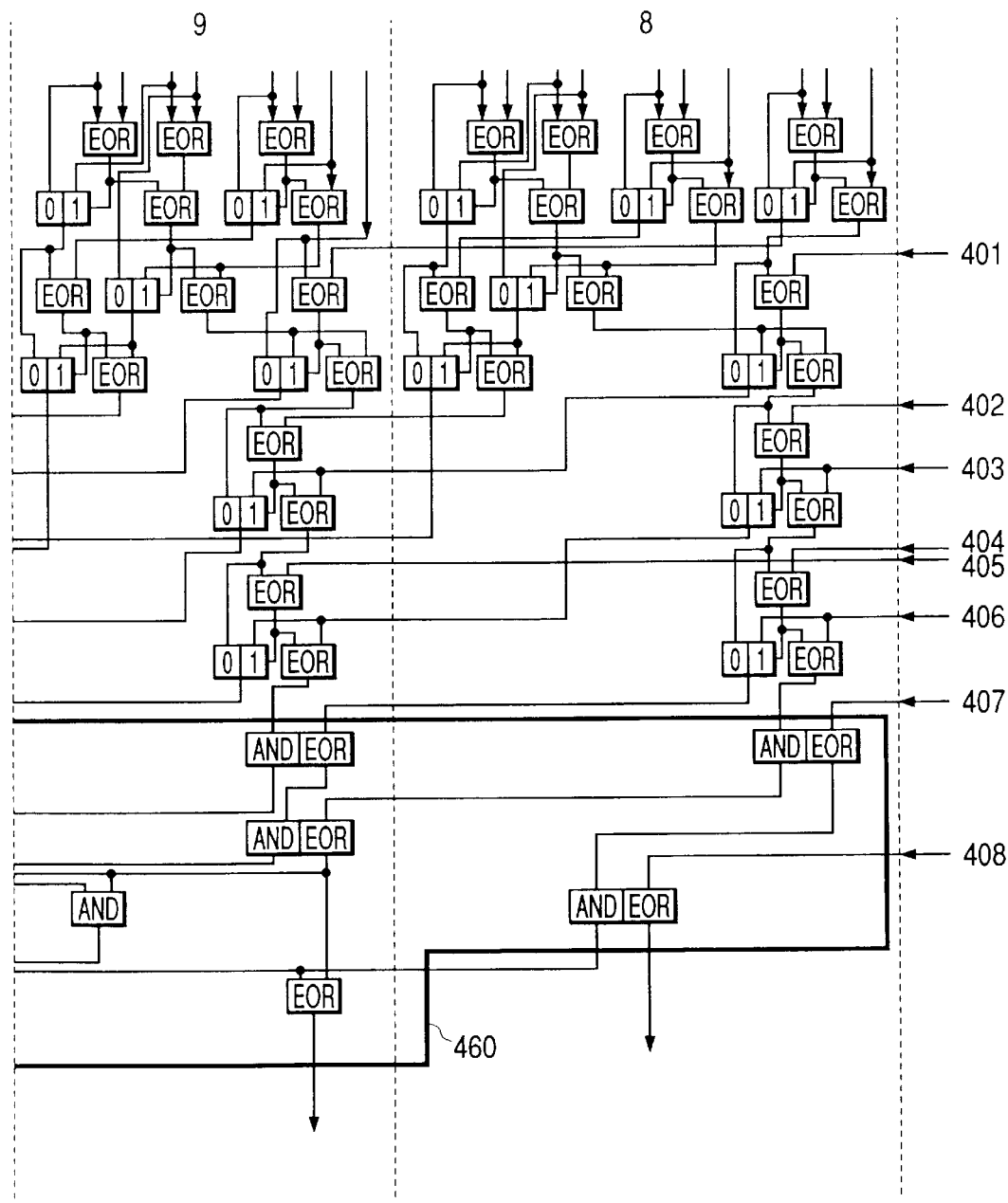
FIG. 9 is a diagram showing a portion for high-order bits 8 to 15 of a logic circuit of the multimedia multiply-adder
Figure 9B:
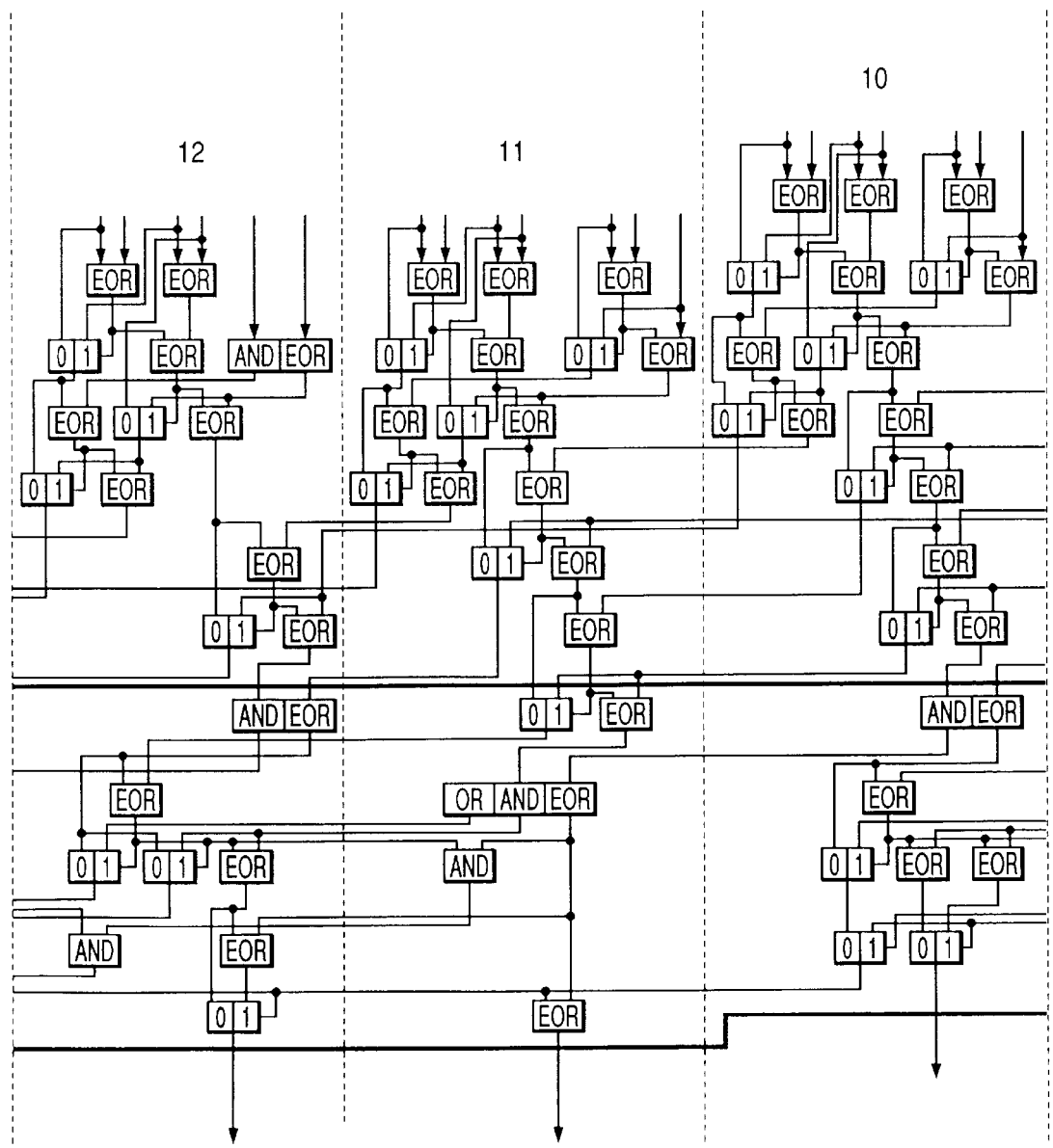
Figure 9C:
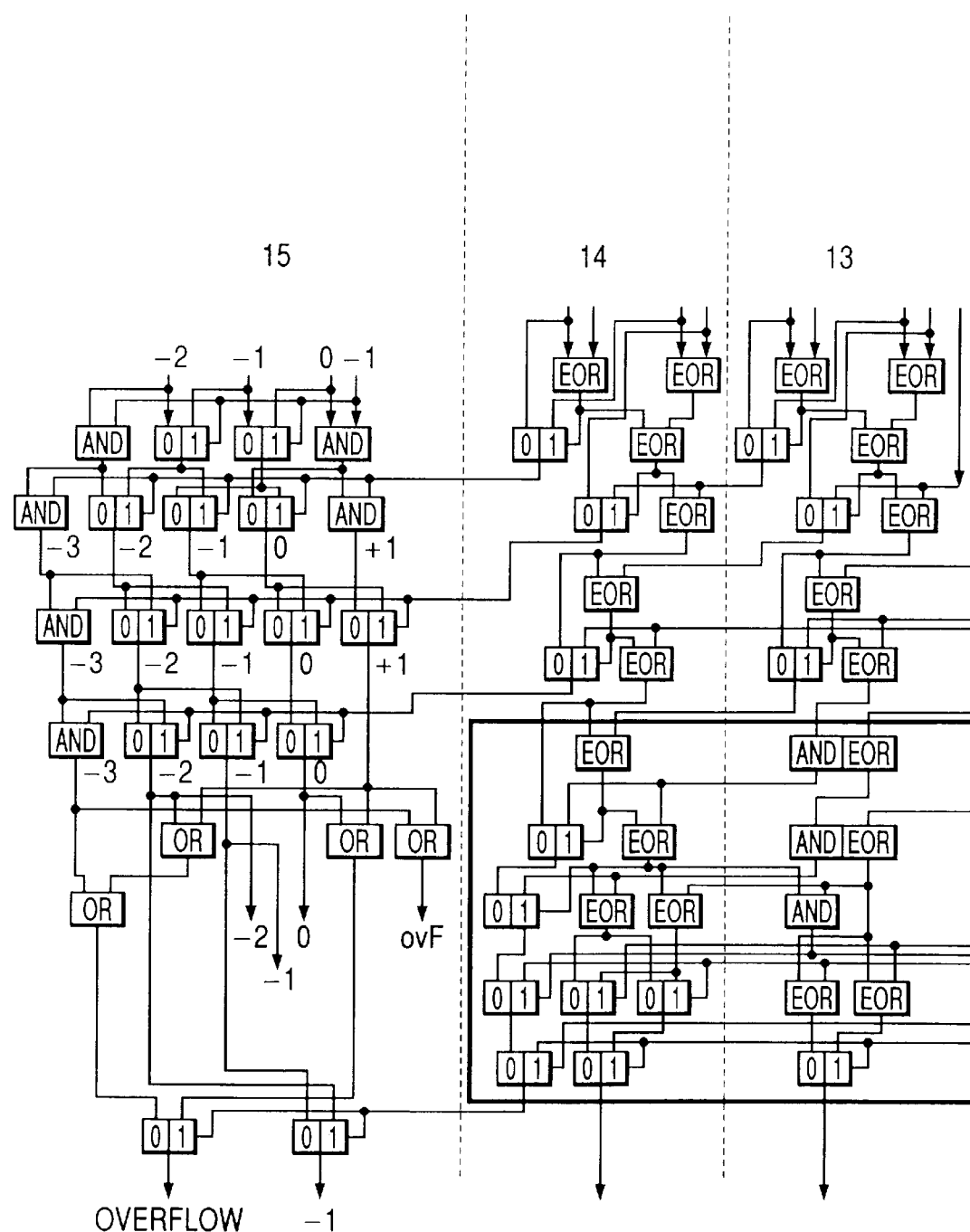

Referring to FIG. 9, the following description explains an effective method and an effective configuration for a case in which a machine cycle becomes so short that the apparent propagation of a carry in the machine cycle can no longer be completed even though the technique described above is adopted. FIG. 9 is obtained by specifying FIG. 8 showing bits at digit positions 8 to 15 as follows. If propagation of a carry to the highest-order digit can not be completed in 1 machine cycle, a part with impossible propagation of a carry is kept in a carry-save state (that is, a sate of the sum of a carry and a digit) as it is and the result is stored in a latch to be returned to an input unit 421 (FIG. 4) as it is. That is, FIG. 9 shows a case in which the digit position 11 and the subsequent digit positions are put in the carry-save state and the number of inputs excessively increases by an extra quantity of 1. At digit position 15 which is the highest-order digit position, it is quite within the bounds of possibility that, as an input state of a stored result due to the carry-save state, the value of 0, −1 or −2 is taken and the states thereof are stored. A −1 sign-part input value of a multiplication result is added thereto (as denoted by reference numeral 470 in FIG. 4). In the case of a plurality of consecutively issued multiply-addition instructions, the data dependence among the instructions is analyzed. When the next processing is carried out by using a result of the current processing, the result of the current processing used to perform the next processing is a result stored in a latch in a carry-save state. As is apparent from FIG. 9, since there is a margin in a timing of an input to a part of the input unit 421, its select circuit can be embedded.

In FIG. 7, 8 or 9, the 7-3 counter 600 is used as a basic block. Thus, circuits operate efficiently in a compactly built block. In addition, as is apparent from FIG. 7, 8 or 9, a carry (2**2) to a digit of an order higher than the current one by two levels, which may require a longer wire, is not supplied to a gate at the next stage. Instead, such a carry is supplied with a margin of at least 1 stage. Thus, it is possible to compensate for a delay caused by the wire.

FIGS. 7, 8 and 9 are diagrams each showing a logic circuit of the multimedia multiply-adder 400 capable of assuring the precision of the processing of 8 bits×9 bits→16 bits. Referring to FIG. 10, a case will now be considered in which the multimedia multiply-adder 400 is applied to, for example, a multimedia multiply-adder 700 capable of assuring the double processing precision of 16 bits×17 bits→32 bits which is twice the precision of the processing of 8 bits×9 bits→16 bits. It is naturally obvious that the multimedia multiply-adder [700] capable of assuring the processing precision of 16 bits×17 bits→32 bits cannot merely be split into four units. However, the multimedia multiply-adder capable of assuring the processing precision of 16 bits×17 bits→32 bits can be configured by using four multimedia multiply-adders 400 capable of assuring the processing precision of 8 bits×9 bits→16 bits as a base. From the standpoint of the performance efficiency of the processing circuit, however, such a configuration can be limited. FIG. 10 shows an arrangement designed to solve this problem, wherein two multimedia multiply-adders 400 capable of assuring the processing precision of 8bits×9 bits→16 bits are placed on the right-upper and left-lower sides respectively as shown. The multimedia multiply-adders 400 are incorporated in an embedded covering configuration to form a multimedia multiply-adder with precision of 16 bits×17 bits→32 bits. It should be noted that, in the processing of 8 bits×9 bits→16 bits, first of all, the data is split and the unused portion is filled with 0 as shown in FIG. 10 so that the processing of 16 bits×17 bits→32 bits is not impaired. An example is shown in FIG. 11. With this example, a processing circuit for the double precision of 16 bits×17 bits→32 bits can be designed by proper combination. In the present invention, by providing a lower-order block processing circuit embedded in a high-order block processing circuit in a covering configuration as described above, a multimedia multiply-adder having a hierarchical structure can be designed. As a result, the multimedia multiply-addition/subtraction intended for a variety of purposes can be split into proper degrees of precision, allowing parallel processing to be carried out to implement efficient operations.

The multimedia multiply-adder capable of assuring processing precision as described above is capable of concurrently carrying out some parallel pieces of processing at different degrees of precision proper for a variety of purposes required in the multimedia processing. In addition, since the multimedia multiply-adder can be implemented by few gate stages, operations can be carried out at high frequencies. When it is desired to store a series of multiplication results obtained consecutively, a carry-save result produced in a middle of one machine cycle can be input and stored as a deposit even if an eventual result of propagation of a carry can not be output during the one machine cycle. Thus, the multiply-adder is suitable for real-time multimedia processing.

What is claimed is:

1. A microprocessor for processing instructions, comprising a multiplier, wherein said instructions include an instruction for driving said multiplier to multiply a signed number by an unsigned number, and wherein said multiplier has a 7-3 counter, a 4-2 compressor, a 3-2 compressor and a 2-2 counter.

2. A microprocessor according to claim 1, wherein said multiplier is an SIMD processor.

3. A microprocessor for processing instructions, comprising a multiply-adder/subtractor; wherein
said instructions include an instruction for driving said multiply-adder/subtractor to multiply a signed number by an unsigned number to result in a product, and to carry out an addition or a subtraction using said product, and wherein
said smultiply-adder/subtractor has a 7-3 counter, a 4-2 compressor, a 3-2 compressor and a 2-2 counter.

4. A microprocessor for processing instructions, comprising a multiply-adder/subtractor, wherein
said instructions include an instruction for driving said multiply-adder/subtractor to carry out discrete cosine processing on a signed number and an unsigned number, and wherein
said multiply-adder/subtractor has a 7-3 counter, a 4-2 compressor, a 3-2 compressor and a 2-2 counter.

5. A microprocessor for processing instructions, comprising a multiply-adder/subtractor, wherein
said instructions include an instruction for driving said multiply-adder/subtractor to carry out multiply-addition/subtraction of A←A±X*Y where notations X and Y denote a signed number and an unsigned number, respectively, and wherein
said multiply-adder/subtractor has a 7-3 counter, a 4-2 compressor, a 3-2 compressor and a 2-2 counter.

6. A microprocessor according to any one of claims 1 to 5, wherein a resulting partial product of a current multiply or multiply-add/subtract operation and a result of a preceding multiply or multiply-add/subtract operation are used to calculate a new calculative result, which is cumulatively added to or cumulatively subtracted from a preceding cumulative result to obtain a new cumulative result.

7. A microprocessor according to claim 6, wherein said microprocessor further has a carry-save adder, a serial carry adder on a low-order-digit side and a carry-select and/or look-ahead adder on a high-order-digit side.

8. A microprocessor according to claim 6, wherein a resulting partial product of a current multiply or multiply-add/subtract operation and a result of a preceding multiply or multiply-add/subtract operation are used to calculate a second calculative result after as long a delay as a time required by a plurality of digits from a high order to complete propagation of a carry, and said second calculative result is cumulatively added to or cumulatively subtracted from a preceding cumulative result to obtain a new cumulative result.

9. A microprocessor according to claim 6, wherein a resulting partial product of a current multiply or multiply-add/subtract operation and a result of a preceding multiply or multiply-add/subtract operation with a plurality of digits from a high order put in a carry-save state are used to calculate a new calculative result, which is cumulatively added to or cumulatively subtracted from a preceding cumulative result to obtain a new cumulative result.

10. A microprocessor according to claim 6, wherein a processing circuit of a low-order block is hierarchically designed into a covering and embedded form in a processing circuit of a high-order block.

11. A microprocessor according to any one of claims 1 to 5, wherein said unsigned number is a cosine constant and said signed number represents picture data.

12. A microprocessor according to any one of claims 3 to 5, wherein said multiply-adder/subtractor is an SIMD processor.

13. A multiply-adder/subtractor comprising a 7-3 counter, a 4-2 compressor, a 3-2 compressor and a 2-2 counter, wherein a resulting partial product of a current multiply or multiply-add/subtract operation and a result of a preceding multiply or multiply-add/subtract operation are used to calculate a new calculative result, which is cumulatively added to or cumulatively subtracted from a preceding cumulative result to obtain a new cumulative result.

14. A multiply-adder/subtracter according to claim 13, comprising a carry-save adder, a serial carry adder on a low-order-digit side and a reversed-staircase-shaped carry-select and/or look-ahead adder on a high-order-digit side.

* * * * *